(12) United States Patent
Kojima et al.

(10) Patent No.: US 10,617,944 B2
(45) Date of Patent: Apr. 14, 2020

(54) GAME SYSTEM, STORAGE MEDIUM HAVING STORED THEREIN GAME PROGRAM, INFORMATION PROCESSING DEVICE, AND INFORMATION PROCESSING METHOD

(71) Applicant: NINTENDO CO., LTD., Kyoto (JP)

(72) Inventors: Takuya Kojima, Kyoto (JP); Masato Mizuta, Kyoto (JP); Ryo Kataoka, Kyoto (JP); Masaru Nii, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 119 days.

(21) Appl. No.: 15/828,998

(22) Filed: Dec. 1, 2017

(65) Prior Publication Data

US 2018/0185751 A1 Jul. 5, 2018

(30) Foreign Application Priority Data

Jan. 5, 2017 (JP) ................. 2017-000538

(51) Int. Cl.
*A63F 13/285* (2014.01)
*A63F 13/211* (2014.01)
(Continued)

(52) U.S. Cl.
CPC .......... *A63F 13/285* (2014.09); *A63F 13/211* (2014.09); *A63F 13/25* (2014.09);
(Continued)

(58) Field of Classification Search
CPC ...... A63F 13/285; A63F 13/211; A63F 13/25; A63F 13/428; A63F 13/843
(Continued)

(56) References Cited

U.S. PATENT DOCUMENTS 6,676,509 B1 * 1/2004 Bear .................. G09B 19/0069
434/219
2002/0002411 A1 1/2002 Higurashi et al.
(Continued)

FOREIGN PATENT DOCUMENTS

JP 2000-116945 4/2000
JP 2000-218046 8/2000
(Continued)

OTHER PUBLICATIONS

Kakinuma, et al., U.S. Appl. No. 15/829,153, filed Dec. 1, 2017 (94 pages).
(Continued)

*Primary Examiner* — Jay Trent Liddle
*Assistant Examiner* — Ryan Hsu
(74) *Attorney, Agent, or Firm* — Nixon & Vanderhye PC

(57) ABSTRACT

An example of a game system includes a controller device and an information processing device. The controller device includes an inertia sensor and a vibrating portion. The controller device transmits, to the information processing device, operation data including data from the inertia sensor. The game system obtains operation data including data from the inertia sensor. The game system determines a speed of an operation of rotating the controller device based on the operation data. The game system vibrates the vibrating portion with an intensity that is determined in accordance with the speed of the rotating operation.

22 Claims, 19 Drawing Sheets

(51) Int. Cl.
*A63F 13/40* (2014.01)
*A63F 13/25* (2014.01)
*A63F 13/428* (2014.01)
*A63F 13/843* (2014.01)
*A63F 13/24* (2014.01)
*A63F 13/2145* (2014.01)
*A63F 13/92* (2014.01)

(52) U.S. Cl.
CPC ............ *A63F 13/40* (2014.09); *A63F 13/428* (2014.09); *A63F 13/843* (2014.09); *A63F 13/2145* (2014.09); *A63F 13/24* (2014.09); *A63F 13/92* (2014.09)

(58) Field of Classification Search
USPC .......................................................... 463/30
See application file for complete search history.

(56) References Cited

U.S. PATENT DOCUMENTS

| | | | |
|---|---|---|---|
| 2007/0270219 A1 | 11/2007 | Sugioka et al. | |
| 2008/0015058 A1* | 1/2008 | Noble | A63B 24/0021 473/423 |
| 2008/0076566 A1* | 3/2008 | Miyamoto | A63F 13/10 463/37 |
| 2008/0132339 A1 | 6/2008 | Taira | |
| 2008/0248872 A1* | 10/2008 | Endo | A63F 13/10 463/36 |
| 2010/0160045 A1 | 6/2010 | Yamada et al. | |
| 2011/0053691 A1 | 3/2011 | Bryant et al. | |
| 2012/0229400 A1 | 9/2012 | Birnbaum et al. | |
| 2016/0162025 A1* | 6/2016 | Shah | G06F 3/016 345/156 |
| 2018/0243647 A1 | 8/2018 | Komori et al. | |

FOREIGN PATENT DOCUMENTS

| | | |
|---|---|---|
| JP | 2007-111568 | 5/2007 |
| JP | 2007-296219 | 11/2007 |
| JP | 2008-000345 | 1/2008 |
| JP | 2008-136681 | 6/2008 |
| JP | 2009-131360 | 6/2009 |
| JP | 2010-142561 | 7/2010 |
| JP | 2013-168124 | 8/2013 |
| JP | WO2016/136934 | 9/2016 |

OTHER PUBLICATIONS

Office Action dated Jul. 17, 2019 in related Japanese Application No. 2017-000538, 3 pages.
Office Action dated Jul. 11, 2019 in corresponding Japanese Application No. 2017-000541, 4 pages.
Notice of Reasons for Refusal dated Jan. 23, 2020 in corresponding Japanese Application No. 2017-000538, 5 pages.

* cited by examiner

GAME SYSTEM, STORAGE MEDIUM HAVING STORED THEREIN GAME PROGRAM, INFORMATION PROCESSING DEVICE, AND INFORMATION PROCESSING METHOD

CROSS REFERENCE TO RELATED APPLICATION

The disclosure of Japanese Patent Application No. 2017-000538, filed on Jan. 5, 2017, is incorporated herein by reference.

FIELD

The present technique relates to a game system, a storage medium storing a game program, an information processing device and an information processing method for a game in which an operation section is vibrated.

BACKGROUND AND SUMMARY

There are conventional game systems in which the controller is vibrated when a predetermined game condition is satisfied during the game.

However, game statuses may not be sufficiently expressed by simply vibrating the controller as in the conventional systems.

Therefore, the present application discloses a game system, a storage medium storing a game program, an information processing device and an information processing method, with which game statuses can be more specifically expressed by way of vibrations.

(1)

An example of a game system described herein includes a controller device and an information processing device.

The controller device includes an inertia sensor, an operation data transmission section and a vibrating portion. The operation data transmission section is configured to transmit, to the information processing device, operation data including data from the inertia sensor. The vibrating portion is configured to vibrate based on a vibration signal obtained from the information processing device.

The information processing device includes an operation data obtaining section, a determining section, a vibration signal generation section and a vibration signal transmission section. The operation data obtaining section obtains the operation data. The determining section determines a speed of an operation of rotating the controller device based on the operation data. The vibration signal generation section generates a vibration signal to vibrate the vibrating portion with an intensity that is determined in accordance with the speed of the rotating operation. The vibration signal transmission section transmits the vibration signal to the controller device.

With configuration (1) above, as compared with a case in which the controller device is simply vibrated in accordance with the game condition, the state of the operation of rotating the controller device and/or the game status in accordance with the rotating operation can be more specifically expressed. Thus, it is possible to allow the player to more specifically recognize the game status based on the vibration of the controller device.

(2)

The vibration signal generation section may be configured to generate the vibration signal in such a manner that the vibrating portion is vibrated with a higher intensity when the speed of the rotating operation is relatively high as compared with a case in which the speed of the rotating operation is relatively low.

With configuration (2) above, it is possible to allow the player to intuitively recognize the speed of the operation of rotating the controller device by the vibration of the controller device.

(3)

The vibration signal generation section may be configured to generate the vibration signal in such a manner that a frequency of vibration of the vibrating portion changes in accordance with the speed of the rotating operation.

With configuration (3) above, the state of the operation of rotating the controller device and the game status in accordance with the rotating operation can be more specifically expressed by the frequency of vibration.

(4)

The vibration signal generation section may be configured to generate a signal representing a waveform of vibration as the vibration signal. The vibrating portion may vibrate based on the waveform represented by the vibration signal. The vibration signal generation section may be configured to generate the vibration signal so that the waveform represented by the vibration signal changes in accordance with the speed of the rotating operation.

With configuration (4) above, the state of the operation of rotating the controller device and/or the game status in accordance with the rotating operation can be more specifically expressed by the waveform of vibration.

(5)

The determining section may be configured to detect an operation of rotating the controller device. The vibration signal generation section may be configured to generate the vibration signal in such a manner that the intensity of vibration of the vibrating portion changes in response to the detection of the rotating operation.

With configuration (5) above, it is possible to allow the player to recognize the detection of the rotating operation by changing the intensity of vibration of the vibrating portion.

(6)

The determining section may be configured to detect an operation of rotating the controller device. The vibration signal generation section may be configured to generate the vibration signal in such a manner that the vibrating portion produces a predetermined vibration in response to the detection of the rotating operation.

With configuration (6) above, it is possible to allow the player to recognize the detection of the rotating operation by the vibration of the vibrating portion.

(7)

The determining section may be configured to calculate, based on an output of the inertia sensor, an orientation of the controller device about at least a predetermined axis. The vibration signal generation section may be configured to generate the vibration signal in such a manner that the vibrating portion produces a first vibration of an intensity that is determined in accordance with the speed of the rotating operation, and produces a second vibration every time the orientation of the controller device changes by a predetermined amount.

With configuration (7) above, it is possible to allow the player to recognize the speed of the rotating operation by both the intensity of the first vibration and the frequency with which the second vibration is produced.

(8)

The determining section may be configured to identify a periodic change in an output of the inertia sensor and to detect the rotating operation based on the identified periodic change.

With configuration (8) above, it is possible to easily detect the rotation operation based on the output of the inertia sensor. For example, it is possible to detect the rotation operation based on the output of the inertia sensor with respect to one axis.

(9)

The determining section may be configured to detect the rotating operation by determining a rotation angle of the controller device for the rotating operation based on angular velocities of the controller device with respect to two predetermined axes based on an output of the inertia sensor.

With configuration (9) above, it is possible to easily detect the rotation operation by using an angular velocity based on the output of the inertia sensor.

(10)

The determining section may be configured to calculate, based on an output of the inertia sensor, an orientation of the controller device about at least a predetermined axis and to detect the rotating operation based on the calculated orientation.

With configuration (10) above, it is possible to easily detect the rotation operation by calculating the orientation of the controller device based on the output of the inertia sensor.

(11)

Another example of a game system described herein includes a controller device and an information processing device.

The controller device includes an inertia sensor, an operation data transmission section and a vibrating portion. The operation data transmission section is configured to transmit, to the information processing device, operation data including data from the inertia sensor. The vibrating portion is configured to vibrate based on a vibration signal obtained from the information processing device.

The information processing device includes an operation data obtaining section, a determining section, a vibration signal generation section and a vibration signal transmission section. The operation data obtaining section obtains the operation data. The determining section determines a speed of an operation of moving the controller device based on the operation data. The vibration signal generation section generates a vibration signal to vibrate the vibrating portion with an intensity that is determined in accordance with the speed of the moving operation. The vibration signal transmission section transmits the vibration signal to the controller device.

With configuration (11) above, as with configuration (1) above, it is possible to allow the player to more specifically recognize the game status based on the vibration of the controller device.

Note that the present specification discloses an example of a game processing method to be executed on a game system as set forth in (1) to (11) above. The present specification also discloses an example of an information processing device as set forth in (1) to (11) above. The present specification also discloses an example of a storage medium storing an information processing program or a game program configured to instruct a computer of the information processing device to function as some of various units equivalent to various sections as set forth in (1) to (11) above.

With the game system, the storage medium storing a game program, the information processing device and the information processing method as set forth above, the game status, which changes in response to operations, can be specifically expressed.

These and other objects, features, aspects and advantages of the present invention will become more apparent from the following detailed description of the present invention when taken in conjunction with the accompanying drawings.

DETAILED DESCRIPTION OF NON-LIMITING EXAMPLE EMBODIMENTS

1. Configuration of Information Processing System

An information processing system according to an example of an exemplary embodiment is described below.

An example of an information processing system 1 according to the exemplary embodiment includes a main body apparatus (in other words, an information processing device; which functions as a game device main body apparatus in the exemplary embodiment) 2, a left controller 3, and a right controller 4. Each of the left controller 3 and the right controller 4 is attachable to and detachable from the main body apparatus 2. That is, the left controller 3 and the right controller 4 are attached to the main body apparatus 2 and used as a unified device. Further, the main body apparatus 2, the left controller 3, and the right controller 4 can also be used as separate bodies (see FIG. 2). The information processing system 1 can be used in a mode in which the image is displayed on the main body apparatus 2, and another mode in which the image is displayed on a different display device (e.g., a stationary monitor) such as a TV. In the former mode, the information processing system 1 can be used as a portable device (e.g., a portable game device). In the latter mode, the information processing system 1 can be used as a home-console device (e.g., a home-console game device). Note that the information processing system 1 of the exemplary embodiment may include a wireless controller that is not attached to the main body apparatus 2.

Description for Main Body Apparatus, Left Controller, and Right Controller

Figure 1:
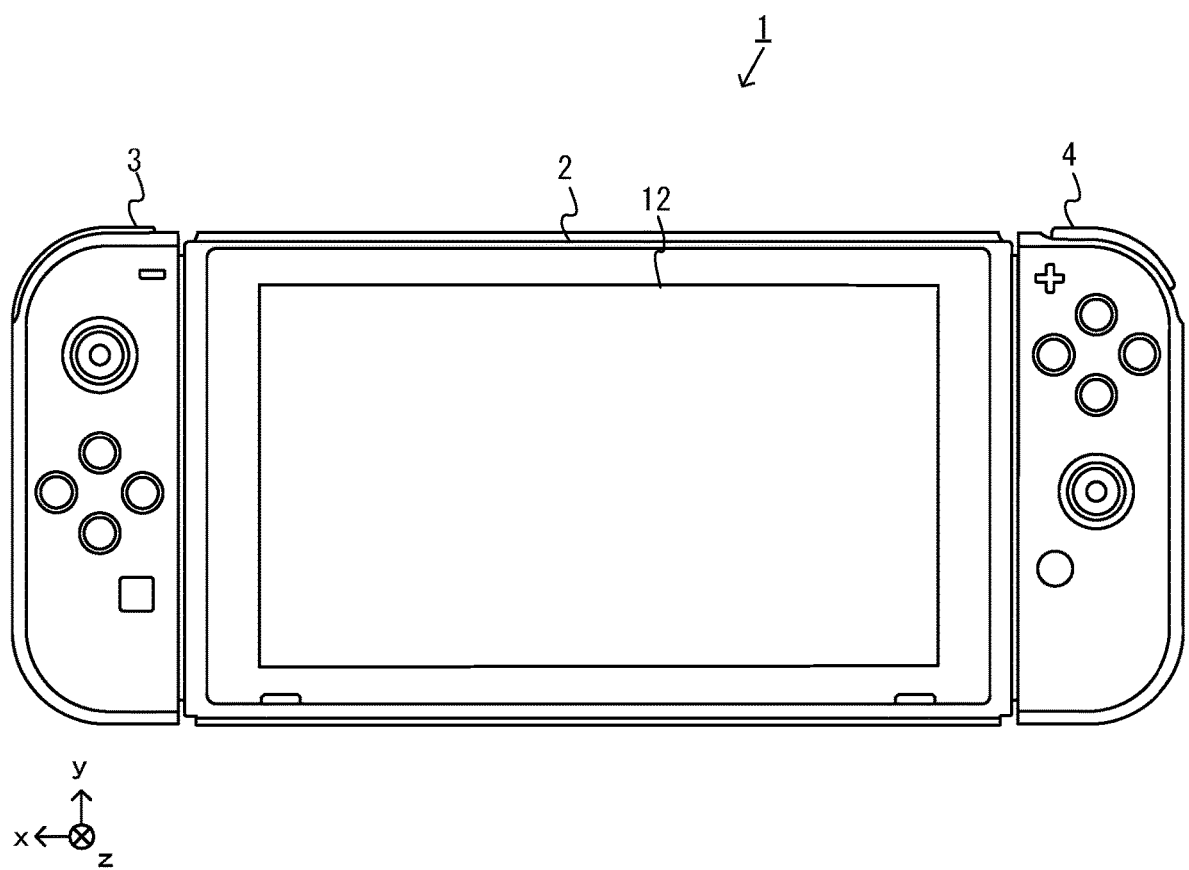
FIG. 1 is a diagram showing a state where an example of a left controller and an example of a right controller are attached to an example of a main body apparatus.

FIG. 1 is a diagram showing a state where the left controller 3 and the right controller 4 are attached to the main body apparatus 2. As shown in FIG. 1, each of the left controller 3 and the right controller 4 is attached to and unified with the main body apparatus 2. The main body apparatus 2 is a device for performing various processes (e.g., game processes) in the information processing system 1. The main body apparatus 2 includes a display 12. Each of the left controller 3 and the right controller 4 is a device including operation sections with which a user provides inputs.

Figure 2:
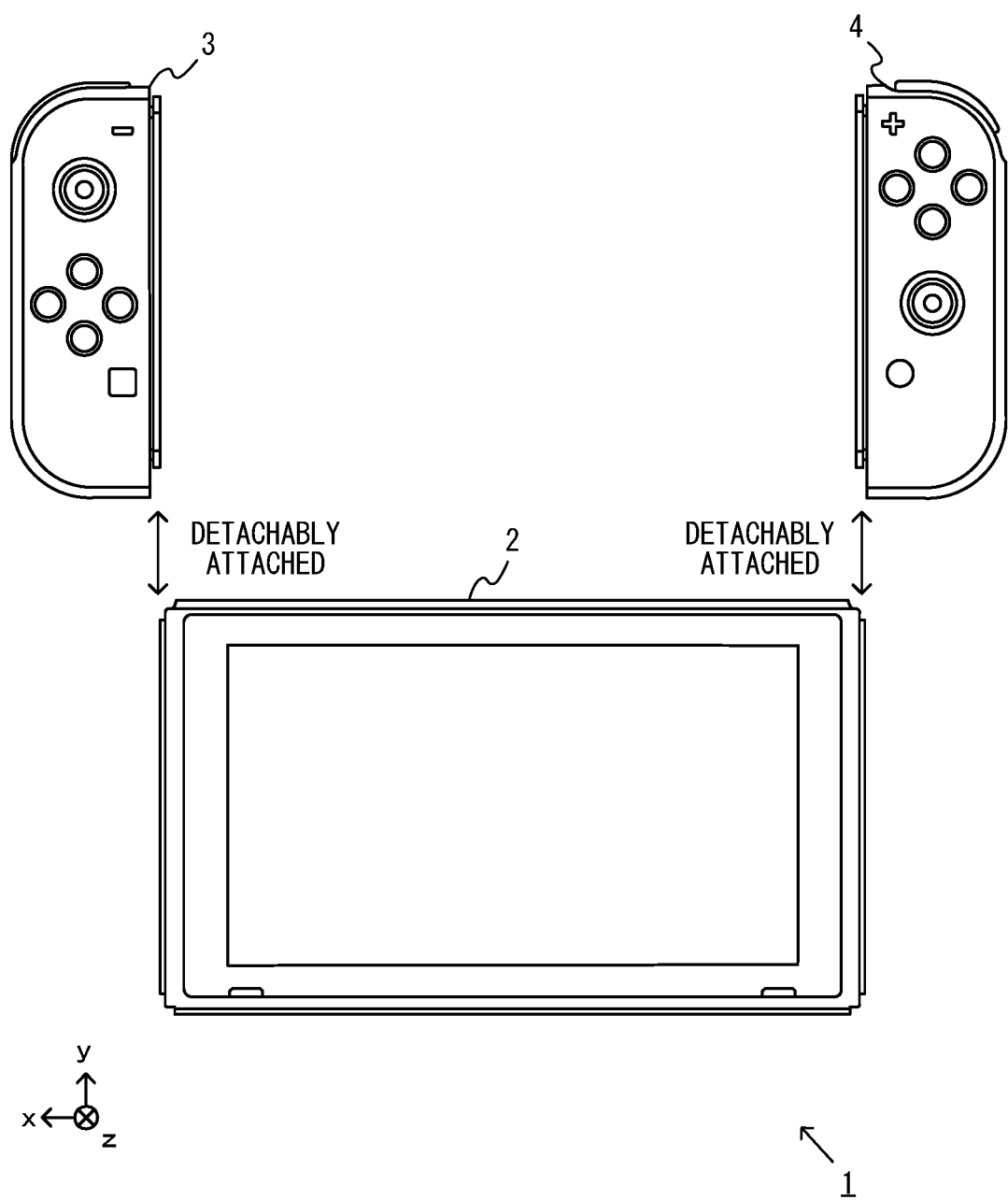
FIG. 2 is a diagram showing a state where an example of a left controller and an example of a right controller are detached from an example of a main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
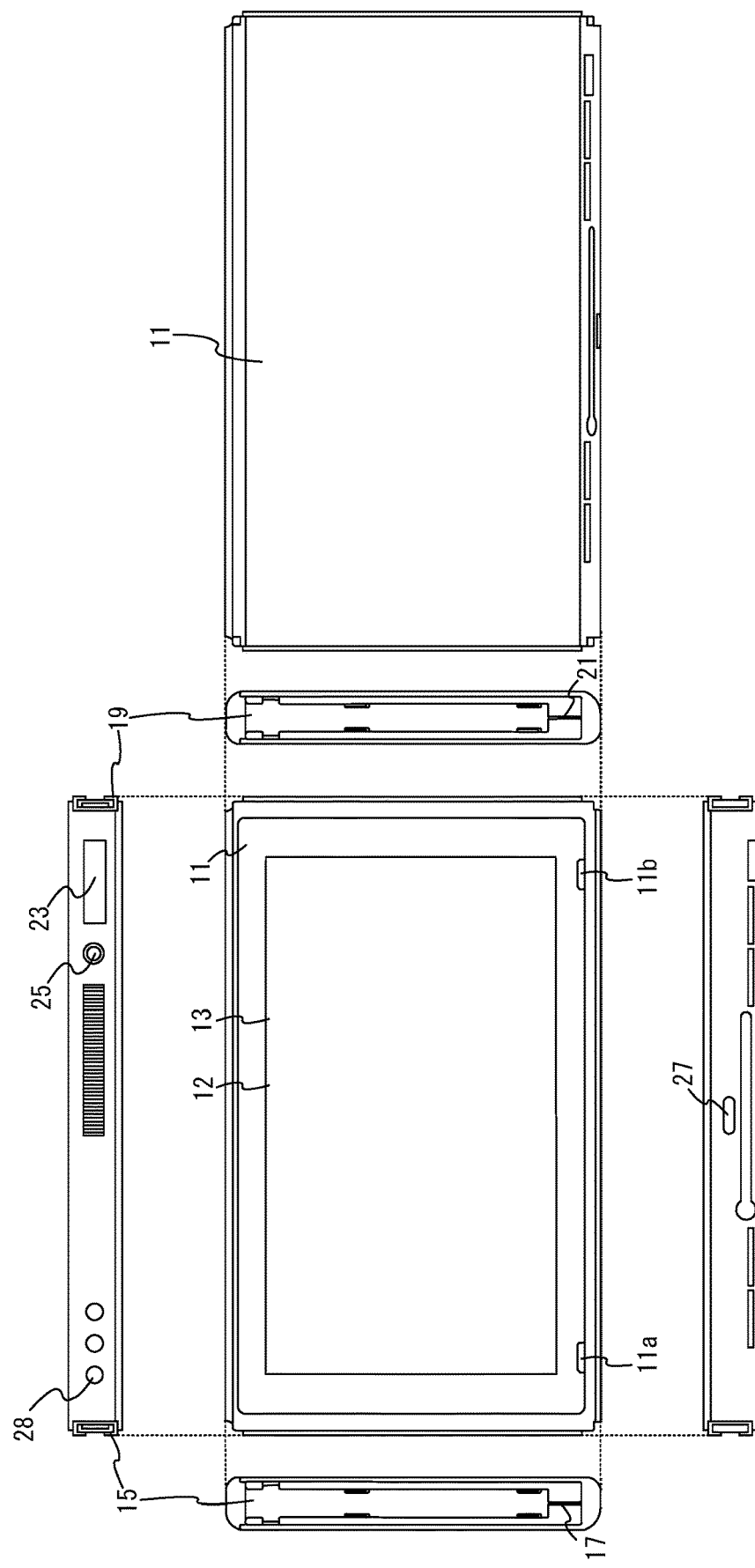
FIG. 3 shows six orthogonal views showing an example of a main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified device obtained by attaching the left controller 3 and the right controller 4 to the main body apparatus 2 may function as a mobile device. The main body apparatus 2 or the unified device may function as a handheld device or a portable device.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a first slot 23. The first slot 23 is provided on an upper side surface of the housing 11. The first slot 23 is so shaped as to allow a first type of storage medium to be attached to the first slot 23. The first type of storage medium is, for example, a dedicated storage medium (e.g., a dedicated memory card) for the information processing system 1 and an information processing device of the same type as the information processing system 1. The first type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified device or the main body apparatus 2 alone is mounted on the cradle, the information processing system 1 can display on a stationary monitor an image generated by and output from the main body apparatus 2. Further, in the exemplary embodiment, the cradle has the function of charging the unified device or the main body apparatus 2 alone mounted on the cradle. Further, the cradle has the function of a hub device (specifically, a USB hub).

Figure 4:
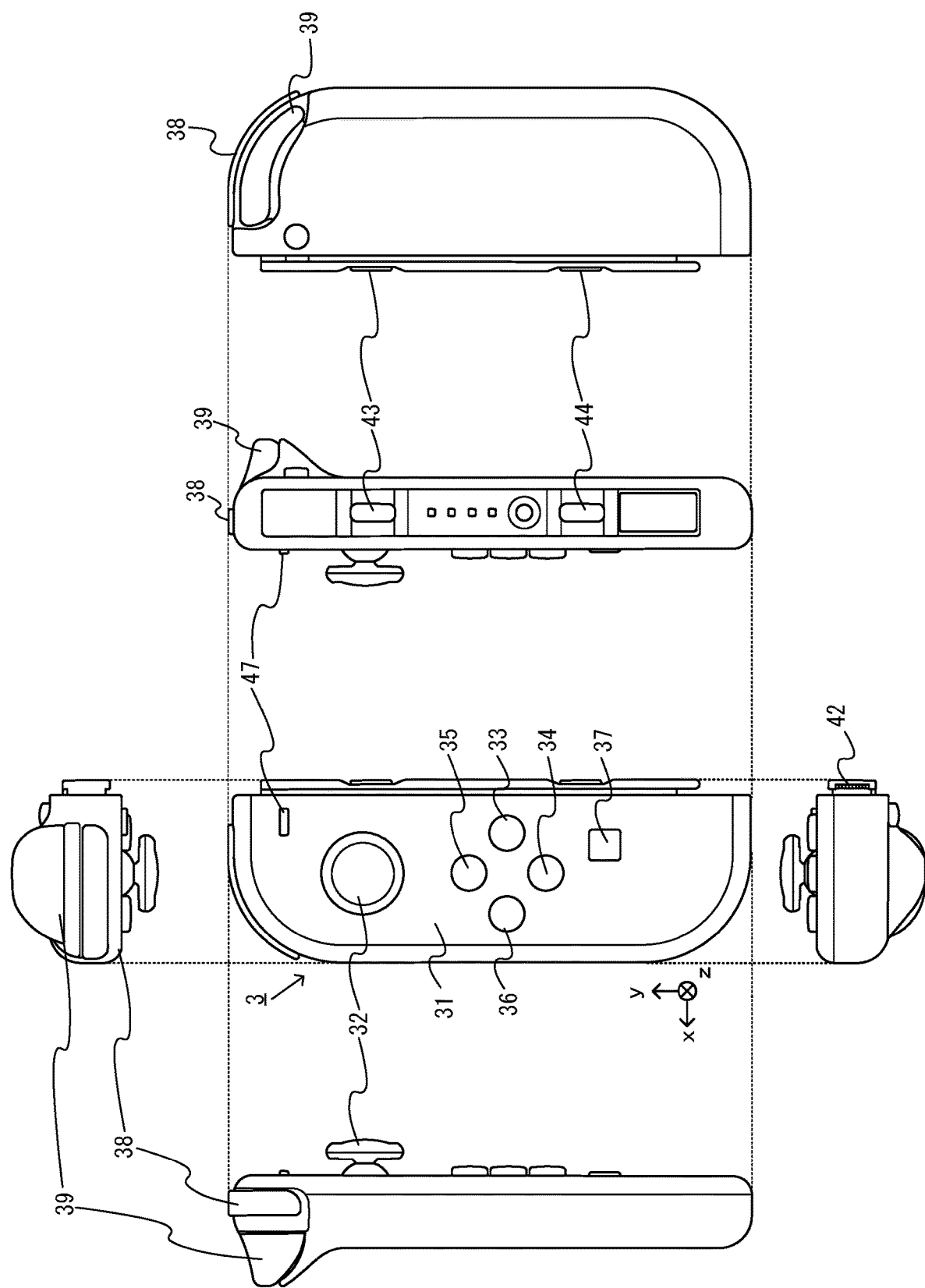
FIG. 4 shows six orthogonal views showing an example of a left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIG. 1). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, an analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that a cross key, a slide stick that allows a slide input, or the like may be provided as the direction input section, instead of the analog stick. Further, in the exemplary embodiment, it is possible to provide an input by pressing the analog stick 32.

The left controller 3 includes various operation buttons. Initially, the left controller 3 includes four operation buttons 33 to 36 (specifically, a right direction button 33, a down direction button 34, an up direction button 35, and a left direction button 36) on the main surface of the housing 31. Further, a record button 37 and a "−" (minus) button 47 are provided. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
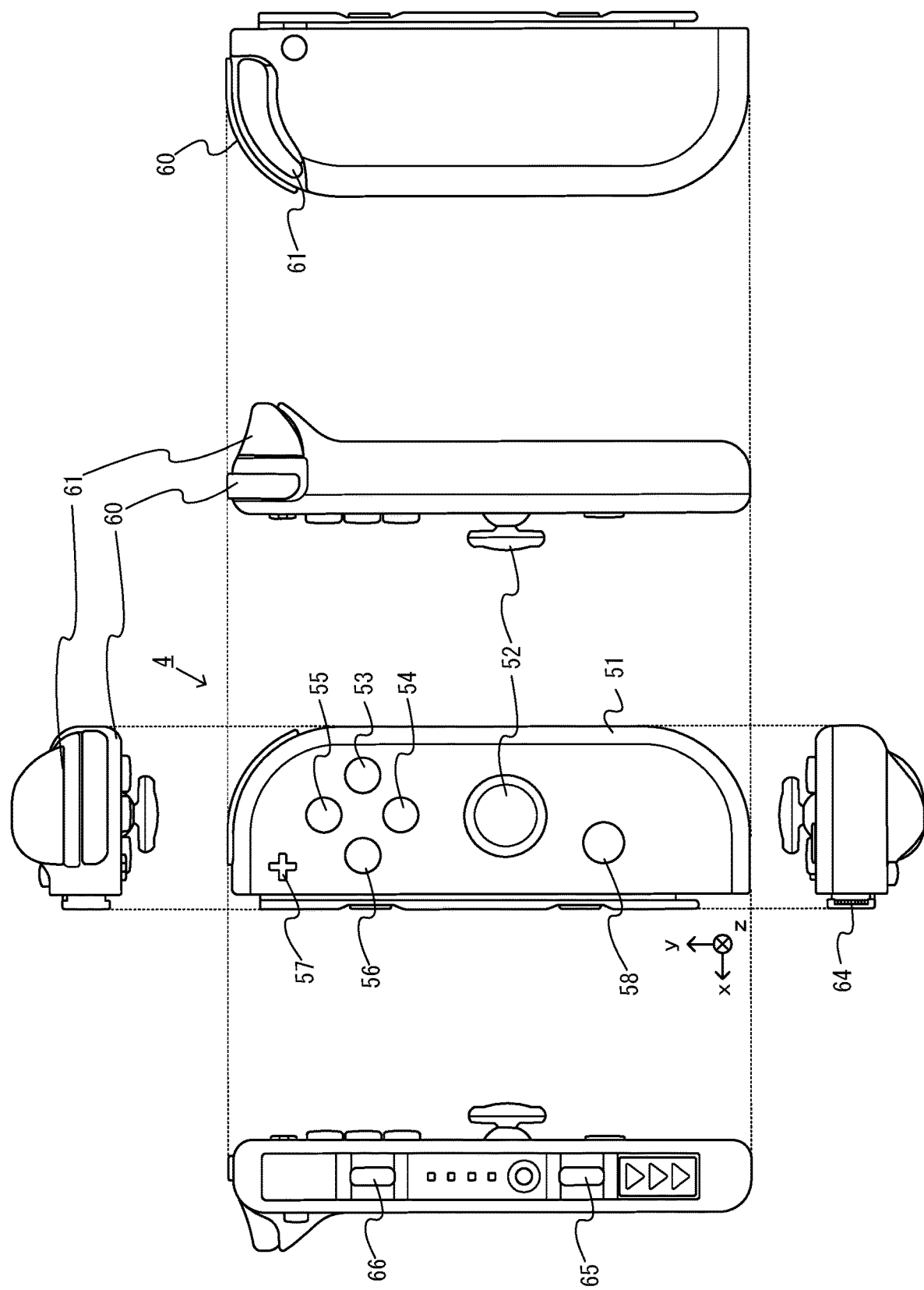
FIG. 5 shows six orthogonal views showing an example of a right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, an analog stick 52 has the same configuration as that of the analog stick 32 of the left controller 3. Further, a cross key, a slide stick that allows a slide input, or the like may be provided instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, a "+" (plus) button 57 and a home button 58 are provided. Further, the right controller 4 includes a first R-button 60 and a ZR-button 61 in an upper right portion of a side surface of the housing 51. Further, similarly to the left controller 3, a second L-button 65 and a second R-button 66 are provided.

Further, the right controller 4 includes a terminal 64 for the right controller 4 to perform wired communication with the main body apparatus 2.

Figure 6:
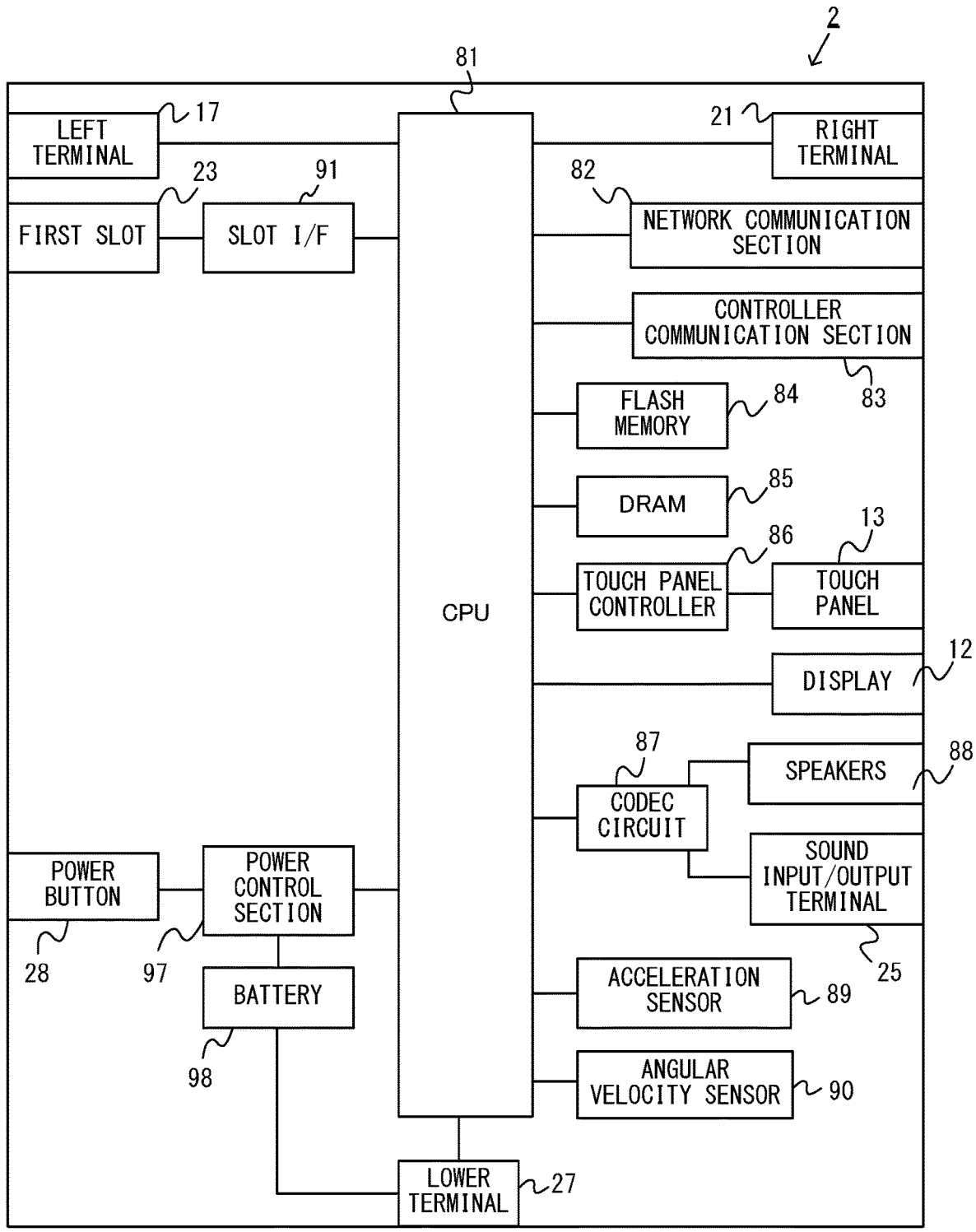
FIG. 6 is a block diagram showing an example of an internal configuration of the main body apparatus.

FIG. 6 is a block diagram showing an example of the internal configuration of the main body apparatus 2. The main body apparatus 2 includes components 81 to 98 shown in FIG. 6 in addition to the components shown in FIG. 3. Some of the components 81 to 98 may be mounted as electronic components on an electronic circuit board and accommodated in the housing 11.

The main body apparatus 2 includes a CPU (central processing unit) 81. The CPU 81 is an information processing section for executing various types of information processing to be executed by the main body apparatus 2, and, strictly, is a SoC (system-on-a-chip) having a plurality of functions such as a CPU function and a GPU function. The CPU 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the CPU 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the CPU 81. The slot I/F 91 is connected to the first slot 23, and in accordance with an instruction from the CPU 81, reads and writes data from and to the first type of storage medium (e.g., a dedicated memory card) attached to the first slot 23.

The CPU 81 appropriately reads and writes data from and to the flash memory 84, the DRAM 85, and each of the above storage media, thereby performing the above information processing.

The main body apparatus 2 includes a network communication section 82. The network communication section 82 is connected to the CPU 81. The network communication section 82 communicates (specifically, through wireless communication) with an external device via a network. In the exemplary embodiment, as a first communication form, the network communication section 82 connects to a wireless LAN and communicates with an external device, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the CPU 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The CPU 81 is connected to the left terminal 17, the right terminal 21, and the lower terminal 27. When performing wired communication with the left controller 3, the CPU 81 transmits data to the left controller 3 via the left terminal 17 and also receives operation data from the left controller 3 via the left terminal 17. Further, when performing wired communication with the right controller 4, the CPU 81 transmits data to the right controller 4 via the right terminal 21 and also receives operation data from the right controller 4 via the right terminal 21. Further, when communicating with the cradle, the CPU 81 transmits data to the cradle via the lower terminal 27. As described above, in the exemplary embodiment, the main body apparatus 2 can perform both wired communication and wireless communication with each of the left controller 3 and the right controller 4. Further, when the unified device obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a user can provide inputs to the main body apparatus 2 by using the plurality of left controllers 3 and the plurality of right controllers 4.

The main body apparatus 2 includes a touch panel controller 86, which is a circuit for controlling the touch panel 13. The touch panel controller 86 is connected between the touch panel 13 and the CPU 81. Based on a signal from the touch panel 13, the touch panel controller 86 generates, for example, data indicating the position where a touch input is provided. Then, the touch panel controller 86 outputs the data to the CPU 81.

Further, the display 12 is connected to the CPU 81. The CPU 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the CPU 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, an acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the CPU 81, and the detection results of the acceleration sensor 89 and the angular velocity sensor 90 are output to the CPU 81. Based on the detection results of the acceleration sensor 89 and the angular velocity sensor 90, the CPU 81 can calculate information regarding the motion and/or the orientation of the main body apparatus 2. Note that while an acceleration sensor and an angular velocity sensor are used in the exemplary embodiment as inertia sensors for calculating the motion, orientation and/or position of the main body apparatus 2, other types of sensors may be used in other embodiments.

The main body apparatus 2 includes a power control section 97 and a battery 98. The power control section 97 is connected to the battery 98 and the CPU 81. Further, although not shown in FIG. 6, the power control section 97 is connected to components of the main body apparatus 2 (specifically, components that receive power supplied from the battery 98, the left terminal 17, and the right terminal 21). Based on a command from the CPU 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
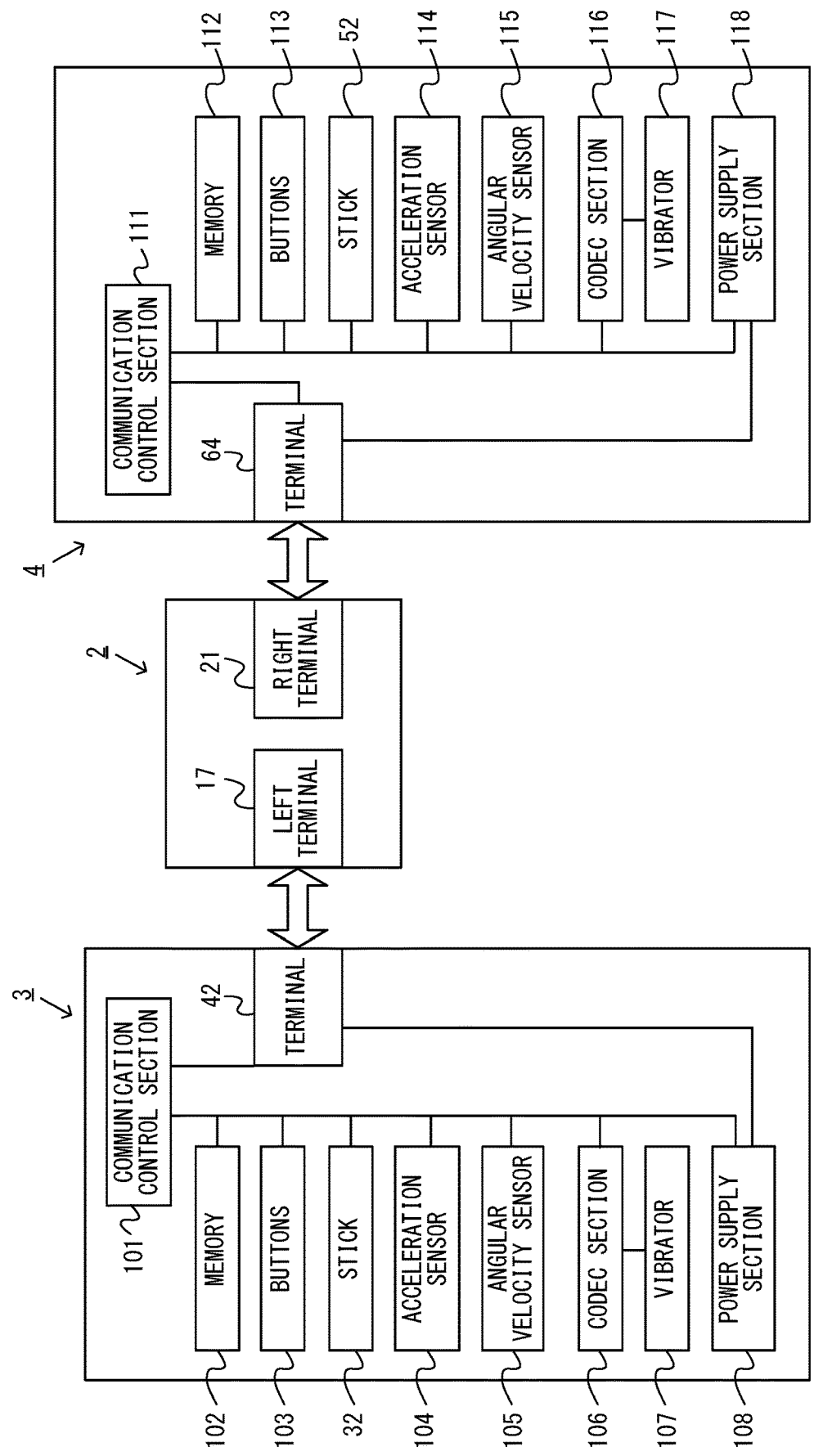
FIG. 7 is a block diagram showing an example of an internal configuration of the main body apparatus, the left controller and the right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44 and 47). Further, the left controller 3 includes the analog stick ("stick" in FIG. 7) 32. Each of the buttons 103 and the analog stick 32 outputs information regarding an operation performed on itself to the communication control section 101 repeatedly with appropriate timing.

The left controller 3 includes inertial sensors. Specifically, an acceleration sensor 104 is provided. Further, an angular velocity sensor 105 is provided. In the exemplary embodiment, an acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly with appropriate timing.

The communication control section 101 acquires information regarding an input (specifically, information regarding an operation, or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by way of vibrations. In the exemplary embodiment, the vibrator 107 is controlled by a vibration command (in other words, a vibration control signal to be described later) from the main body apparatus 2. That is, if receiving the above vibration command from the main body apparatus 2, the communication control section 101 drives the vibrator 107 in accordance with the received vibration command. Here, the left controller 3 includes a codec section 106. If receiving the above vibration command, the communication control section 101 outputs a control signal corresponding to the vibration command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, information indicating the waveform itself may be transmitted. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

Thus, in the exemplary embodiment, the vibrator 107 is capable of vibrating in a plurality of different modes of vibration (e.g., magnitudes, frequencies and/or patterns of vibration). The main body apparatus 2 generates a signal representing a waveform of vibration (i.e., the vibration control signal) and transmits the signal to the controller, and the vibrator 107 vibrates based on the waveform represented by the signal. Note that the "signal representing a waveform of vibration" may be the digital signal described above or may be a signal that represents the vibration waveform itself. Note that while the digital signal described above represents the frequency and the amplitude for every unit time, it may represent a waveform including a plurality of different frequencies and a waveform including a plurality of different amplitudes by connecting together a plurality of unit signals each representing a frequency and an amplitude. That is, the main body apparatus 2 may be able to vibrate the controller with a waveform that includes a plurality of different frequency components by vibrating the controller with a waveform that includes a different amplitude and/or frequency of vibration for every unit time.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (specifically, an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a vibration command from the main body apparatus 2, the communication control section 111 causes the vibrator 117 to operate, using the codec section 116.

The right controller 4 includes a power supply section 118. The power supply section 118 has a function similar to that of the power supply section 108 of the left controller 3 and operates similarly to the power supply section 108.

2. Outline of Process Performed on Information Processing System

Figure 8:
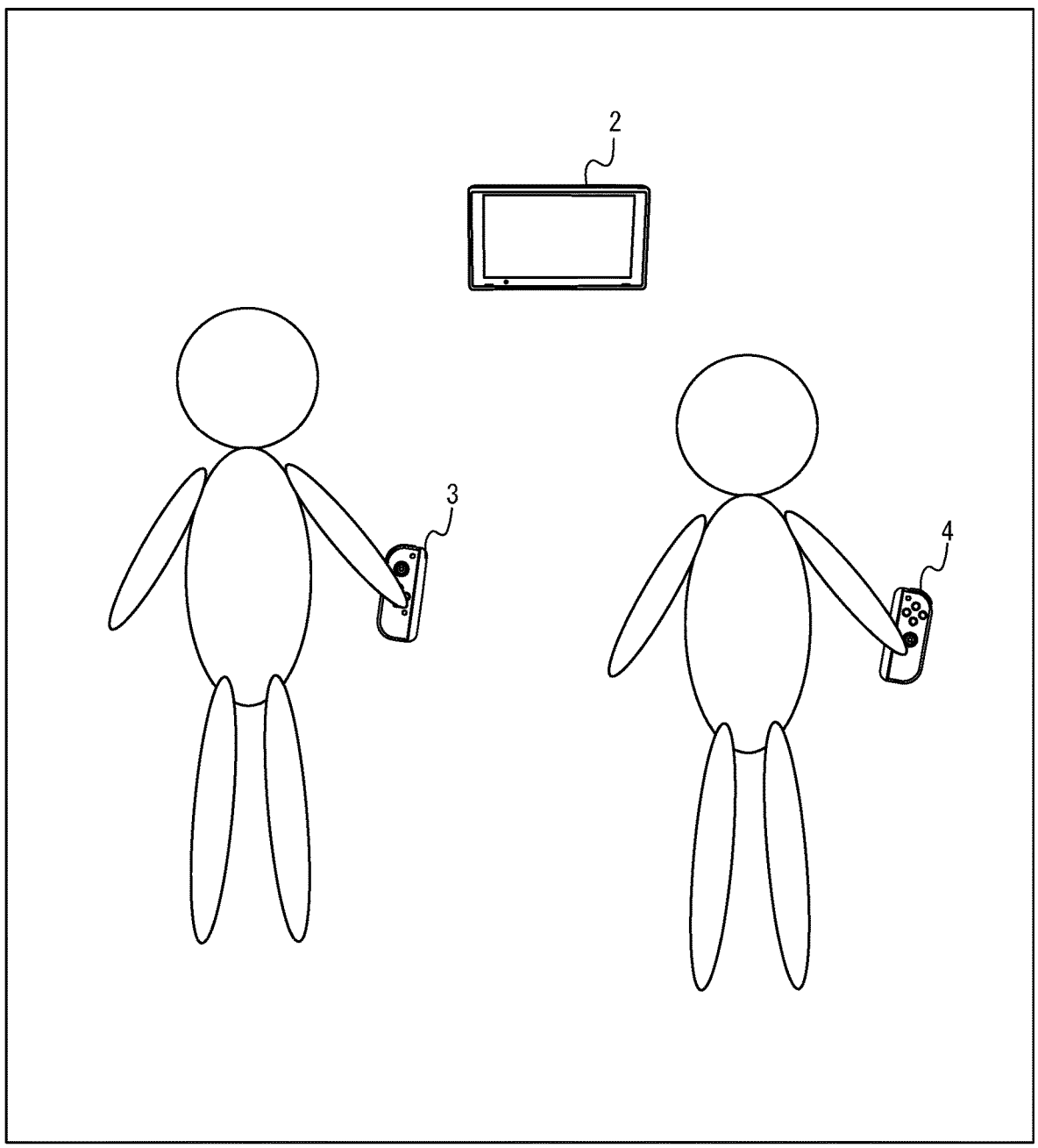
FIG. 8 is a diagram showing an example of how an information processing system of the exemplary embodiment is used.
Figure 9:
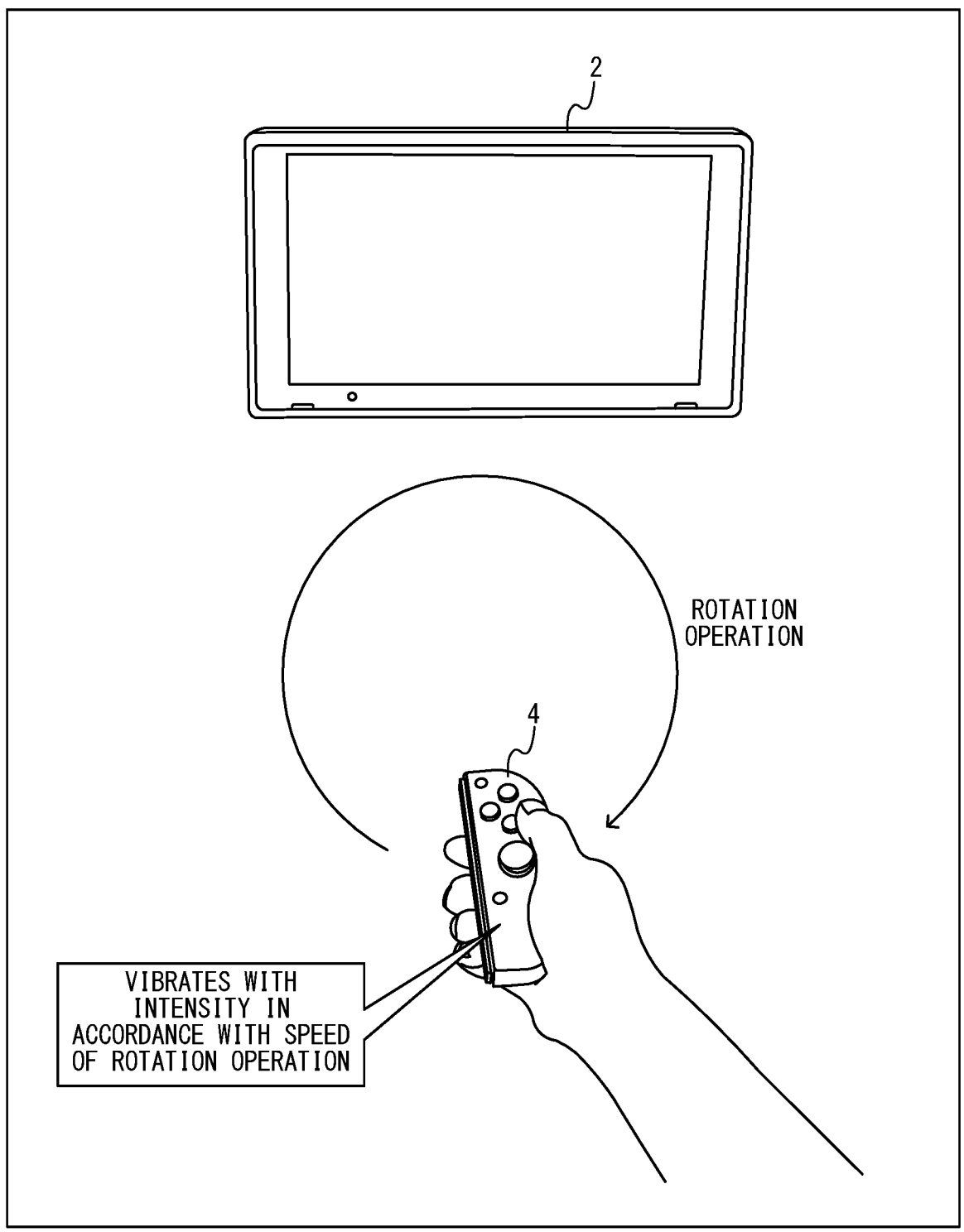
FIG. 9 is a diagram showing an example of a rotation operation using a controller of the exemplary embodiment.

Next, referring to FIG. 8 and FIG. 9, processes to be performed on the information processing system 1 will be outlined. FIG. 8 is a diagram showing how the information processing system of the exemplary embodiment is used. As shown in FIG. 8, in the exemplary embodiment, players (in other words, users) use their controllers detached from the main body apparatus 2. The main body apparatus 2 is placed in the vicinity of the players. Note that in the exemplary embodiment, when a controller is detached from the main body apparatus 2, the controller wirelessly communicates with the main body apparatus 2. In other embodiments, the controller may be connected to, and communicate with, the main body apparatus 2 via a cable.

In the exemplary embodiment, one player uses one controller. Note that in game examples to be described later, two players may each use one controller to play the game, as shown in FIG. 8. Note that in other embodiments, one player may use two controllers. For example, a player may play the game holding one controller in each hand.

FIG. 9 is a diagram showing an example of a rotation operation using a controller of the exemplary embodiment. In the exemplary embodiment, the player performs an operation of moving the controller as a game operation. Specifically, as shown in FIG. 9, the player performs an operation of rotating the controller (referred to as the rotation operation). The rotation operation may be an operation of moving the position of the controller generally along a circular trajectory as shown in FIG. 9 or an operation of changing the orientation of the controller about a certain axis (see FIG. 17), or may be a combination of these operations.

In the exemplary embodiment, the information processing system 1 vibrates the controller with an intensity that is determined in accordance with the speed of the controller rotation operation. The speed of a rotation operation as used herein may refer to, for example, the speed of a single iteration of the rotation operation (in other words, the inverse of the amount of time required for the single iteration of the rotation operation), the velocity of rotating the controller during a rotation operation (in other words, the amount of rotation per unit time), or the frequency of the rotation operation.

In the exemplary embodiment, the process of detecting a controller rotation operation and the process of calculating the speed of the rotation operation are performed based on the sensing results of inertia sensors of the controller (specifically, the acceleration sensor and/or and the angular velocity sensor). The details of these processes will be described later. Note that these processes may be performed by a method different from a method based on the sensing results of inertia sensors. For example, in other embodiments, the two processes may be performed based on an image captured by a camera that is configured to capture the image of the controller or an image captured by a camera provided on the controller.

In the exemplary embodiment, the intensity of vibration of a controller changes in accordance with the speed of the rotation operation of the controller. For example, the controller may be vibrated more intensely as the controller is rotated more (see the first game example to be described later), or the controller may be vibrated more intensely as the rotation velocity is higher (see the second and third game examples to be described later). Therefore, according to the exemplary embodiment, the information processing system 1 can more specifically express the state of the rotation operation and/or the game status in accordance with the rotation operation, as compared with a case in which the controller is vibrated simply in accordance with the game condition, and the player is allowed to more specifically recognize the game status. That is, the player is allowed to recognize, via vibration, the result of the rotation operation. For example, in a game example to be described later, the player is allowed to recognize the level of power that has been charged through the rotation operation, the speed of the rotation operation, or the speed of rotation of the rotation operation.

3. Game Example Performed by Using Information Processing System

Game examples to be executed on the information processing system 1 of the exemplary embodiment will now be described. As a game in which a game operation is performed by the rotation operation described above, the information processing system 1 can allow the player to play a game to be described below, for example. Note that the information processing system 1 may execute the game process of one or more of the first to third game examples to be described below.

3-1: First Game Example

A first game example will be described with reference to FIG. 10 to FIG. 13. The first game example is a multi-player game that is played by two players, and is a game in which the two players play against each other. In the first game example, each player controls the controller like a magic wand. Note that in the following description, the player holding the left controller 3 will be referred to as the first player and the player holding the right controller 4 as the second player.

Outline of First Game Example

Figure 10:
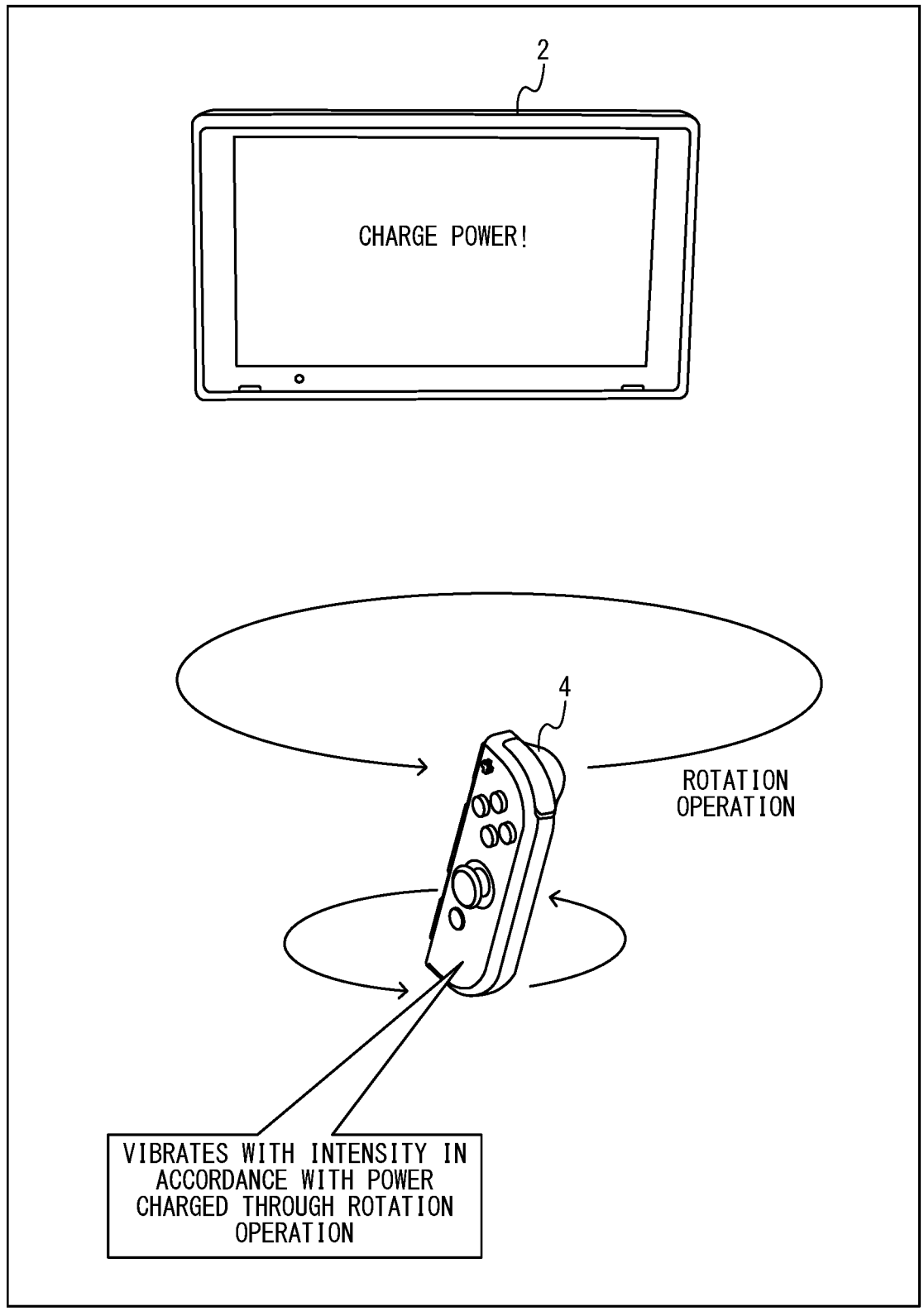
FIG. 10 is a diagram showing an example of an operation during a first step of a first game example.
Figure 12:
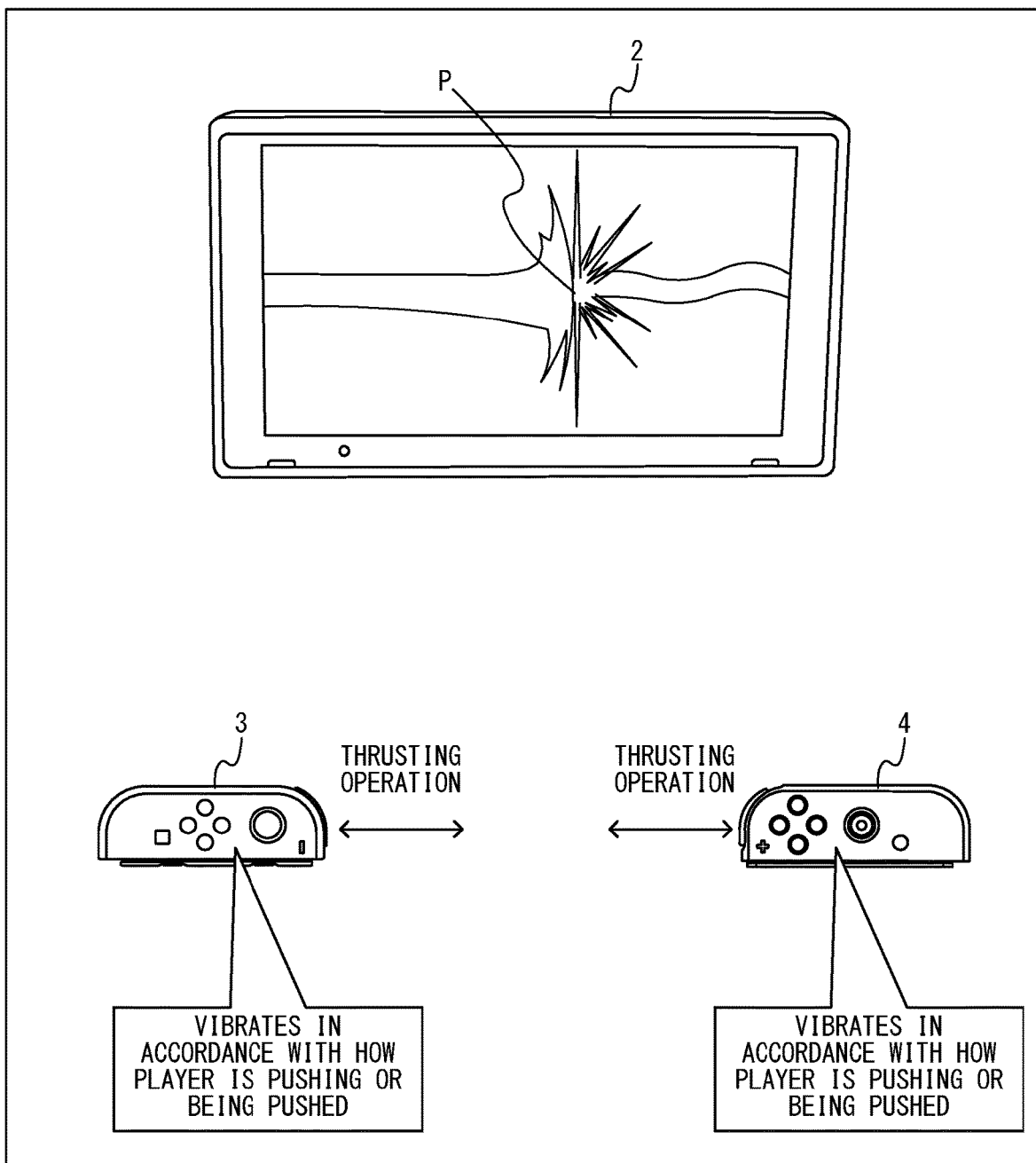
FIG. 12 is a diagram showing an example of an operation during a second step of the first game example.

In the first game example, first, as the first step of the game, the players perform a game operation of charging magic power through a rotation operation (FIG. 10). Then, as the second step of the game, the players perform an operation of firing the magic power that has been charged in the first step at each other (FIG. 12). In the first game example, in the second step, whoever drives their wave of magic power onto the opponent's side wins.

First Step

First, the first step of the game will be described. FIG. 10 is a diagram showing an example of an operation in the first step of the first game example. Note that although FIG. 10 shows only one controller (the right controller 4), two players each operate a controller in actual gameplay.

In the first step, each player performs the rotation operation using the controller. The information processing system 1 executes the game process of charging magic power in accordance with the rotation operation by each player. Herein, the rotation operation of the first game example is an operation of moving (in other words, rotating) the controller held in a standing position along a circular trajectory on a horizontal plane, as shown in FIG. 10. Note that the standing position is a position in which the longitudinal direction of the controller (i.e., the y-axis direction shown in FIG. 4 or FIG. 5) generally coincides with the vertical direction. In the exemplary embodiment, each player holds the controller so that the upper side of the controller (i.e., the y-axis positive direction side; in other words, the side on which the first L button or the first R button is provided) is facing up. In practice, when a player performs the rotation operation, the controller moves so that the upper end of the controller moves along a larger circle than the lower end thereof (see FIG. 10) (rather than moving while maintaining the upright position). In the first game example, the information processing system 1 determines that a single iteration of the rotation operation has been performed when the controller has completed one round of rotational movement.

When each player performs the rotation operation as described above, the controller will move as shown in FIG. 10. Therefore, when a player repeatedly performs the rotation operation, the angular velocity (in other words, the orientation) about one axis that is perpendicular to the longitudinal direction of the controller changes periodically, with one cycle of change in the angular velocity corresponding to one rotation of the controller during the rotation operation. Therefore, it is possible to detect the rotation operation described above by referring to the angular velocity for rotation about one axis that is perpendicular to the longitudinal direction of the controller (i.e., the x axis or the z axis shown in FIG. 4 or FIG. 5).

Thus, in the first game example, the information processing system 1 detects the rotation operation based on the waveform of the sensing result (i.e., the angular velocity) of the angular velocity sensor about the one axis. Specifically, because the sensing result of the angular velocity sensor changes periodically, with one cycle of change corresponding to one rotation during the rotation operation, the information processing system 1 determines that a rotation operation has been performed when a feature point (e.g., the (local) maximum value or the (local) minimum value) in the waveform of the angular velocity is detected since the previous detection of that feature point. Thus, it is possible to detect the rotation operation based on the sensing result of a 1-axis angular velocity sensor, enabling the detection of the rotation operation by a simple method.

In the first game example, upon detection of the rotation operation, the information processing system 1 performs a process of charging magic power in accordance with the rotation operation. Then, the controller is vibrated with an intensity that is determined in accordance with the magic power charged.

Figure 11:
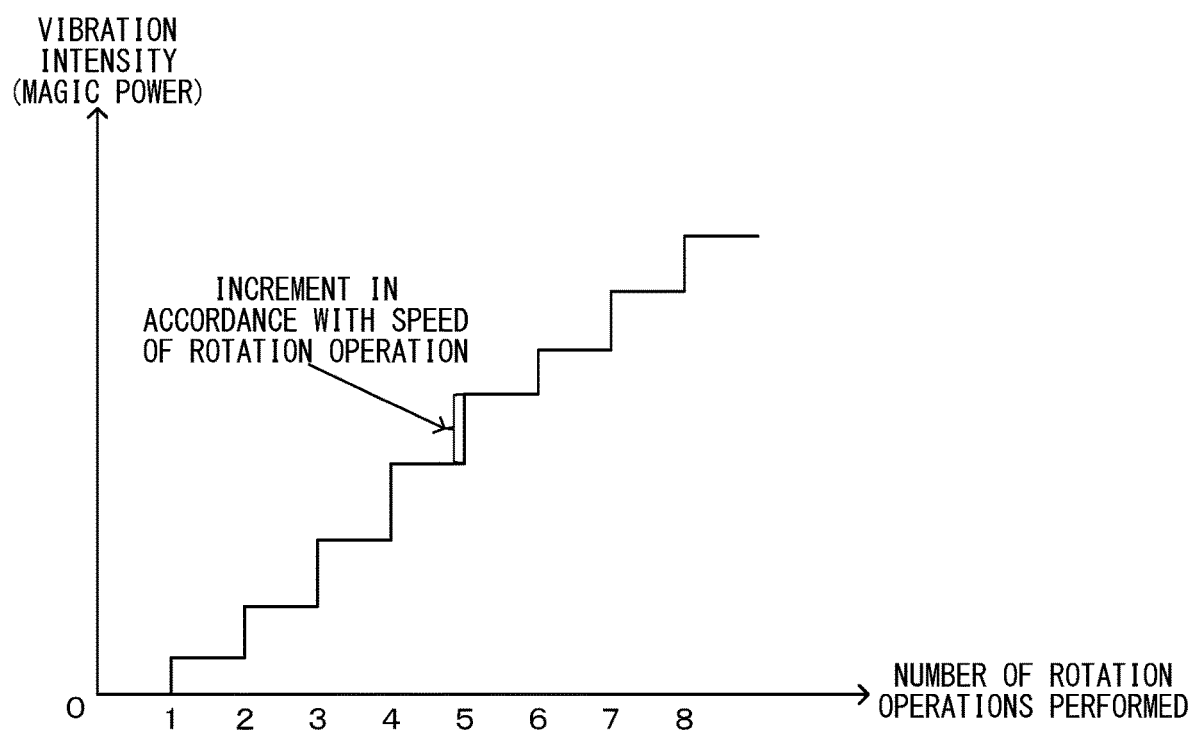
FIG. 11 is a graph showing an example of a relationship between the rotation operation and the vibration intensity in the first game example.

FIG. 11 is a graph showing an example of a relationship between the rotation operation and the vibration intensity in the first game example. In the graph shown in FIG. 11, the horizontal axis represents the number of times the rotation operation has been performed, and the vertical axis represents the vibration intensity (in other words, magic power charged). As shown in FIG. 11, the information processing system 1 accumulates magic power each time the rotation operation is performed. That is, in the first game example, the information processing system 1 changes (specifically, increases) the intensity of vibration of the controller in response to the detection of the rotation operation. Therefore, in the first game example, the intensity of vibration of the controller gradually increases each time the rotation operation is performed.

In the exemplary embodiment, the increment of vibration intensity (in other words, the increment of magic power) to be added for each iteration of the rotation operation is determined based on the speed of that rotation operation. In the exemplary embodiment, the speed of the rotation operation is the inverse of the amount of time that has been taken for that rotation operation. That is, the information processing system 1 determines that the speed of the rotation operation is higher as the amount of time taken for the rotation operation is shorter, and accordingly sets a greater increment of vibration intensity (see FIG. 11). Note that the amount of time taken for one iteration of the rotation operation is calculated as the amount of time from when a rotation operation is detected until the detection of the following rotation operation.

Note that in the exemplary embodiment, there is no particular limitation on the specific method of determining the vibration intensity from the magic power as long as the intensity of vibration of the controller is determined in accordance with the amount of magic power that has been charged. The information processing system 1 may determine the vibration intensity in proportion to the magic power, or may increase the vibration intensity stepwise in response to the increase in the magic power.

As described above, in the first game example, the information processing system 1 identifies a periodic change in the output of the inertia sensor to detect the rotation operation based on the identified periodic change. The information processing system 1 determines the speed of the detected rotation operation based on the identified periodic change.

In the first step, the information processing system 1 detects the rotation operation of the controller, charges magic power in accordance with the speed of the rotation operation, and performs the process of vibrating the controller in accordance with the speed of the rotation operation for each controller (each player).

Note that there is no particular limitation on the method of detecting the rotation operation and the method of calculating the speed of the rotation operation. In other embodiments, the rotation operation may be detected by using the sensing result of an angular velocity sensor for 2 or more axes. The information processing system 1 may detect the rotation operation using the sensing result of an acceleration sensor instead of (or in addition to) that of an angular velocity sensor. The speed (velocity) of rotation may be calculated by any method based on the sensing result of the inertia sensor (i.e., the angular velocity and/or the acceleration of the controller). For example, the information processing system 1 may calculate the speed (in other words, velocity) of rotation based on the maximum value, the average value or the cumulative value, during a rotation operation, of the angular velocity and/or the acceleration of the controller.

In the first step of the first game example, an image prompting a rotation operation (e.g., a message "Charge power") is displayed on the display 12 of the main body apparatus 2. Note that the information processing system 1 may or may not display, on the display 12, an image representing a rotation operation of the controller (e.g., a moving image representing the controller being rotated). The information processing system 1 may or may not display, on the display 12, an image (e.g., a gauge) representing the amount of magic power that has been charged for each player.

Second Step

When a predetermined amount of magic power is charged in the first step, the process transitions to the second step of the first game example. Note that the second step may be started on a condition that a predetermined amount of magic power has been charged for both of the two players, or the second step may be started on a condition that a predetermined amount of magic power has been charged for either one of the two players. Note that in the latter case, the second step will be started with a disadvantage for the other player, who has not yet charged a predetermined amount of magic power.

FIG. 12 is a diagram showing an example of an operation in the first step of the first game example. In the second step, as shown in FIG. 12, the two players each perform an operation (referred to as the "thrusting operation") of thrusting forward the controller held in a horizontal position (i.e., a position in which the longitudinal direction of the controller generally coincides with the horizontal direction). In the second step, the display 12 of the main body apparatus 2 displays an image representing waves of magic power of the two players colliding each other (see FIG. 12). In the first game example, whoever drives the magic power collision position P onto the edge of the display 12 on the opponent's side (i.e., the left edge or the right edge of the screen) wins.

The collision position P moves left and right on the display 12, and the movement is controlled according to a predetermined algorithm. While there is no particular limitation on the method of controlling the collision position P, the collision position P is controlled according to the following rules, for example, in the exemplary embodiment:

- The driving force for each player is determined based on the angle of the controller (specifically, the angle with respect to the horizontal direction), etc., and the basic amount by which the collision position P is to be moved (specifically, the amount of movement per unit time) is calculated based on the driving forces of the players.
- When one player (first player) performs a thrusting operation, the collision position P is moved toward the side of the other player (second player).
- When the second player performs a thrusting operation immediately after (e.g., within a predetermined amount of time from) the thrusting operation by the first player, the collision position P is moved toward the first player's side by an amount of movement that is greater than the amount of movement by which the collision position P has been moved in response to the thrusting operation of the first player.

Note that the information processing system 1 changes the driving force and the amount of movement by the thrusting operation in accordance with the amount of magic power that has been charged in the first step.

In the second step, the information processing system 1 causes the controller of each player to produce the following vibrations:

(a) a vibration of an intensity that is determined in accordance with the speed of movement of the collision position P;

(b) a vibration in response to a thrusting operation performed by the player; and (c) a vibration in response to a thrusting operation performed by the opponent.

The vibration (a) is produced constantly while the collision position P is being moved. The vibrations (b) and (c) are each produced only for a predetermined period of time in response to a thrusting operation. When more than one of the vibrations (a) to (c) are produced simultaneously, the controller is vibrated with an intensity that is obtained by adding together the intensities of vibration.

Note that in the first game example, the vibrations (a) to (c) are of the same frequency. In other embodiments, however, the vibrations (a) to (c) may be of different frequencies from each other. In other embodiments, the vibrations (a) to (c) may each be a vibration of a different waveform and/or a different vibration pattern.

Note that in the first game example, the information processing system 1 may output, from the speakers 88, a sound in accordance with the vibration of the controller. For example, in the first step, a sound may be output in accordance with the amount of magic power that has been charged. Specifically, a sound effect may be produced such that the sound volume or the sound pitch varies in accordance with the amount of magic power that has been charged. A sound effect may be produced each time a rotation operation is performed. For example, in the second step, a sound effect may be produced such that the sound volume or the sound pitch varies in accordance with the speed of movement of the collision position P. A sound effect may be produced each time a thrusting operation is performed.

As described above, according to the first game example, in the first step, the vibration intensity of the controller increases in accordance with the rotation operation (and the speed of the rotation operation) of the controller. Then, the player can recognize, based on the vibration of the controller, how magic power is being charged. In the exemplary embodiment, since the vibration of the controller increases as more magic power is charged, the player can intuitively recognize how magic power is being charged.

Specific Game Process Example of First Game Example

Figure 13:
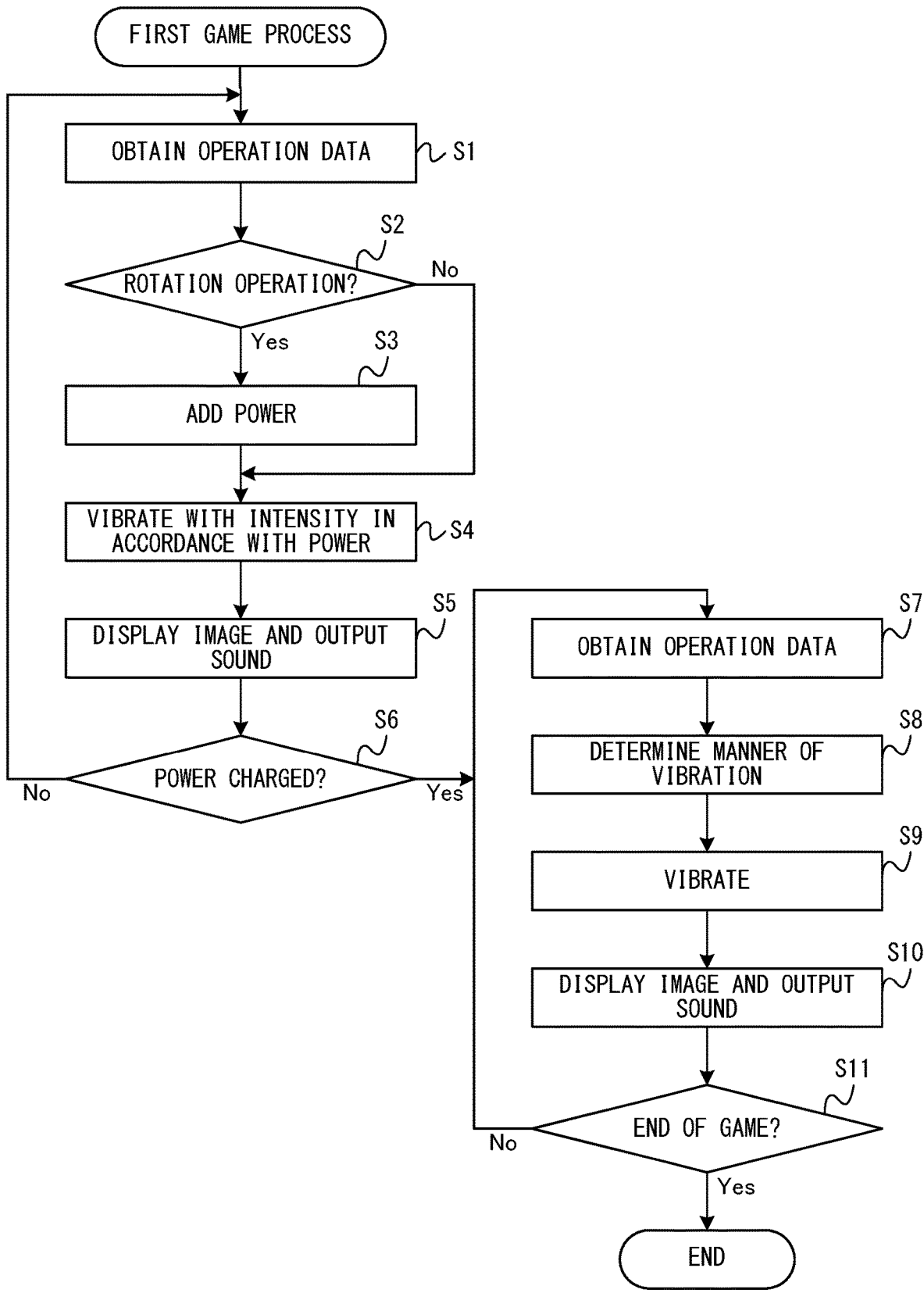
FIG. 13 is a flow chart showing an example flow of a first game process executed on an information processing system.

FIG. 13 is a flow chart showing an example flow of a game process of the first game example (referred to as the "first game process") to be executed on the information processing system. Note that in the exemplary embodiment, a storage section that can be accessed by the information processing system 1 (e.g., a storage medium of a first type described above, or the flash memory 84) stores a game program including a program of the first game process. The series of processes shown in FIG. 13 is started as the CPU 81 of the main body apparatus 2 executes the program of the first game process.

Note that while the CPU 81 of the main body apparatus 2 executes the processes of the steps shown in FIG. 13 (this similarly applies to FIG. 16 and FIG. 19) in the exemplary embodiment, the processes of some of the steps of the flow chart may be executed by a processor other than the CPU or a dedicated circuit. The processes of the steps of the flow chart shown in FIG. 13 (this similarly applies to FIG. 16 and FIG. 19) are merely an example, and the order of steps may be switched around, or other processes may be executed in addition to (or instead of) these steps, as long as similar results are obtained.

In step S1, the CPU 81 obtains operation data from each controller. That is, the CPU 81 obtains operation data received from each controller via the controller communication section 83, and stores the received operation data in the DRAM 85. The process of step S2 is executed, following step S1.

In step S2, the CPU 81 determines whether or not a rotation operation has been performing using the controller. That is, based on operation data stored in the DRAM 85, the CPU 81 determines whether or not a rotation operation has been performed using the controller associated with the operation data. Note that the detection of the rotation operation is done by the method described in "(First step)" above. When the determination result of step S2 is affirmative, the process of step S3 is executed. On the other hand, when the determination result of step S2 is negative, the process of step S4 to be described later is executed, skipping the process of step S3.

In step S3, the CPU 81 increases the magic power for the player of the controller with which the rotation operation was performed in step S2. Herein, the CPU 81 stores, for each player, information representing the amount of magic power charged for the player in the DRAM 85. In step S3, the CPU 81 updates the information stored in the DRAM 85 so that the stored information represents the increased magic power. The process of step S4 is executed, following step S3.

In step S4, the CPU 81 vibrates each controller with an intensity that is determined in accordance with the magic power. That is, the CPU 81 identifies the intensity with which each controller is to be vibrated based on the information representing magic power stored in the DRAM 85. Moreover, as the vibration command described above for vibrating the vibrator 107 or 117 of the controller, the CPU 81 transmits a vibration command that specifies the identified intensity of vibration to the controller via the controller communication section 83. The controller (specifically, the communication control section) that has received the vibration command vibrates the vibrator by outputting a control signal in accordance with the vibration command to the amplifier. Thus, the vibrator vibrates, thereby vibrating the controller, with an intensity specified by the vibration command Note that in the exemplary embodiment, the CPU 81 transmits the vibration command to the controller so that the controller is vibrated constantly (in other words, a vibration is produced continuously) while magic power is being charged. The process of step S5 is executed, following step S4.

In step S5, the CPU 81 displays a game image on the display 12 and outputs a game sound such as a BGM or a sound effect from the speakers 88. In the exemplary embodiment, in the first step of the first game example, the process of step S5 is executed at a rate of once per a predetermined period of time (i.e., one frame period), thereby outputting a moving image of the game image and a game sound. In the first step, an image prompting a rotation operation is displayed (see FIG. 10). Moreover, a game sound in accordance with the vibration of the controller is output from the speakers 88. The process of step S6 is executed, following step S5.

In step S6, the CPU 81 determines whether or not a predetermined amount of magic power has been charged. The CPU 81 makes the determination based on information representing magic power stored in the DRAM 85 in step S3 described above. When the determination result of step S6 is affirmative, the process of step S7 is executed. On the other hand, when the determination result of step S6 is negative, the process of step S1 is executed again. In the first step, the series of processes of steps S1 to S6 is executed repeatedly. Note that the determination of step S6 may be made based on the elapse of a predetermined period of time.

In step S7, the CPU 81 obtains operation data from each controller. The process of step S7 is similar to the process of step S1 described above. The process of step S8 is executed, following step S7.

In step S8, the CPU 81 determines the intensity of vibration of each controller based on the operation of the controller. Specifically, by the method described in "(Second step)" above, the CPU 81 determines the presence/absence and the intensity of vibration of the vibrations (a) to (c) described above, and determines the intensity of vibration of the controller as a total of the intensities of vibration. The CPU 81 stores information representing the determined intensity of vibration in the DRAM 85. The process of step S9 is executed, following step S8.

In step S9, the CPU 81 vibrates each controller with the intensity determined in step S8. That is, by referring to the information representing the intensity of vibration stored in the DRAM 85, the CPU 81 transmits, to each controller, a vibration command for vibrating the vibrator of the controller. Note that in step S9, although the content specified by the vibration command described above differs from that of step S4 described above, the process operation for vibrating each controller is similar to the process of step S4 described above. The process of step S10 is executed, following step S9.

In step S10, the CPU 81 displays a game image on the display 12, and outputs a game sound such as a BGM or a sound effect from the speakers 88. In the exemplary embodiment, in the second step, the process of step S10 described above is executed at a rate of once per a predetermined period of time (i.e., one frame period), thereby outputting a moving image of the game image and a game sound. In the second step, a game image representing waves of magic power colliding each other (see FIG. 12) is displayed on the display 12. Moreover, a game sound in accordance with the vibration of the controller is output from the speakers 88. The process of step S11 is executed, following step S10.

In step S11, the CPU 81 determines whether or not to end the game. For example, when the match is decided based on the collision position P being moved to the side of either one of the two players, or when a predetermined time limit is reached, the CPU 81 determines to end the game. When the determination result of step S11 is negative, the process of step S7 is executed again. In the second step, the series of processes of steps S7 to S11 is executed repeatedly. On the other hand, when the determination result of step S11 is affirmative, the CPU 81 ends the first game process shown in FIG. 13.

3-2: Second Game Example

A second game example will be described with reference to FIG. 14 to FIG. 16. The second game example is a game that can be played by a single player, and is a game in which the player controls the controller as if it were the stick for plate spinning so as to virtually spin a plate. Note that since the player uses one controller in the second game example, a plurality of players can play the game simultaneously by using a plurality of controllers.

Outline of Second Game Example

Figure 14:
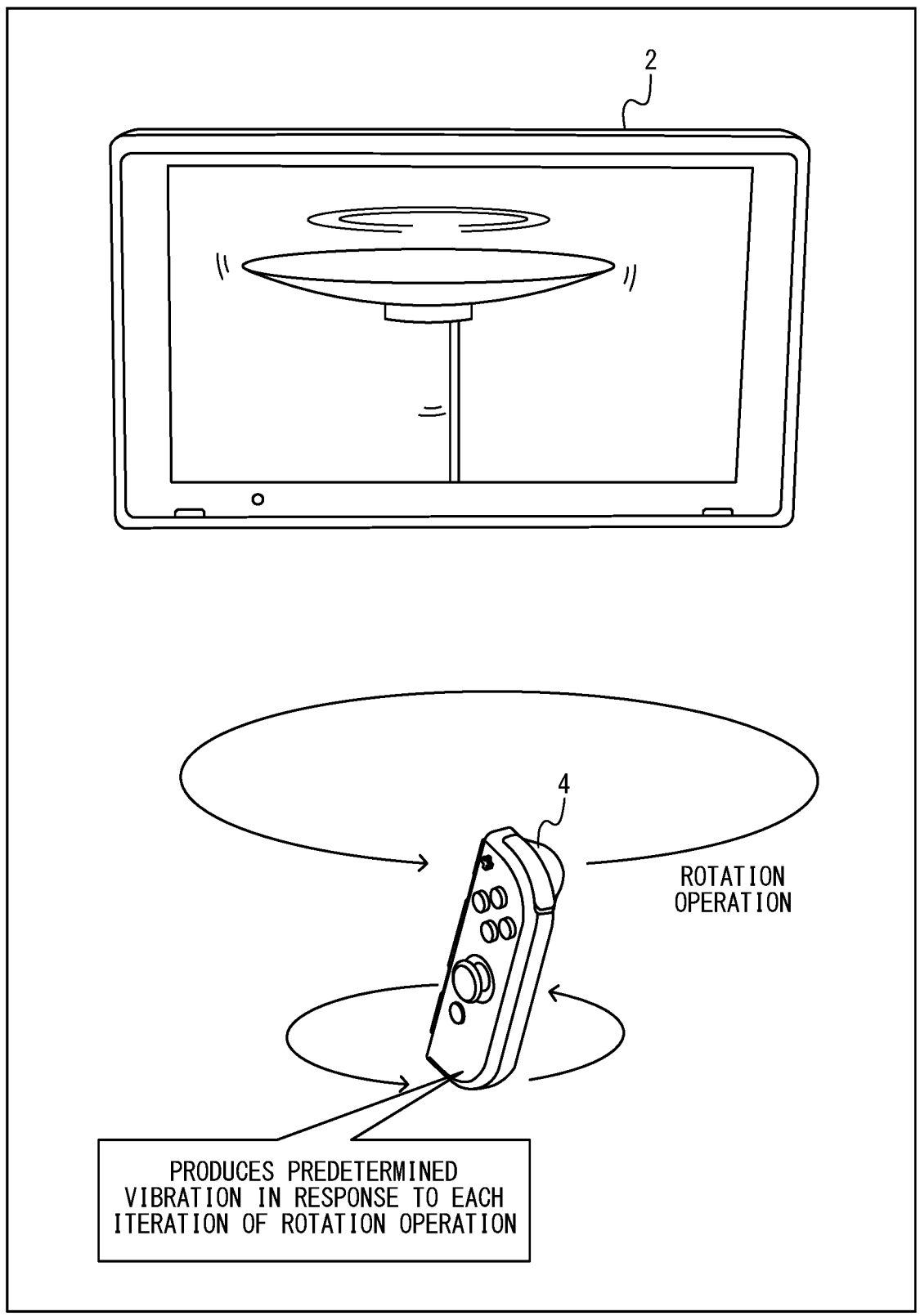
FIG. 14 is a diagram showing an example of an operation in a second game example.
Figure 15:
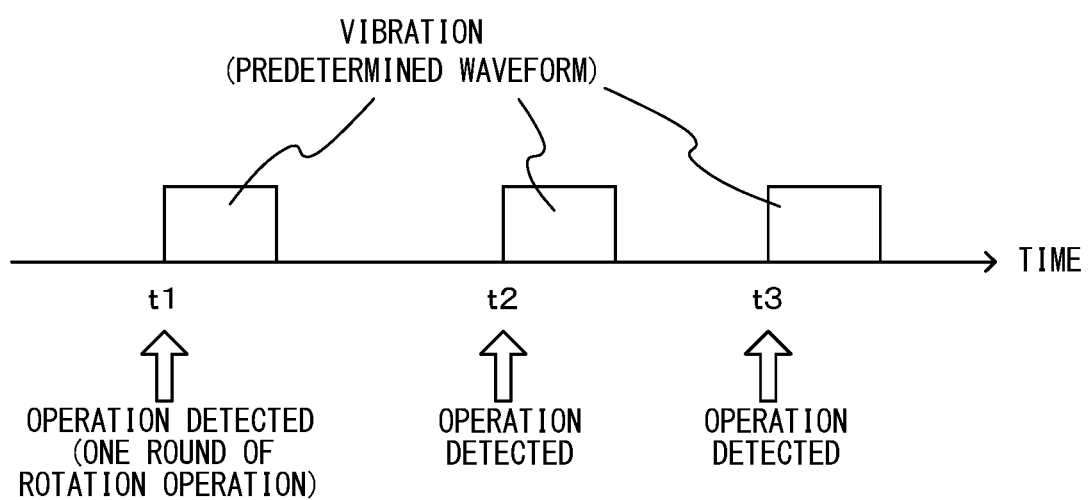
FIG. 15 is a diagram showing an example of a relationship between the rotation operation and the vibration of the controller in the second game example.

FIG. 14 is a diagram showing an example of an operation of the second game example. In the second game example, as shown in FIG. 14, the player performs a rotation operation using the controller. The rotation operation of the second game example is an operation of rotating the controller as if it were the stick for plate spinning That is, the rotation operation of the second game example is an operation of moving the controller held in an upright position along a circular trajectory on a horizontal plane, as in the first game example. In the second game example, the information processing system 1 determines that a single iteration of the rotation operation has been performed when the controller completes one round of rotational movement. Note that while the player in the second game example also performs a similar operation to that of the first game example, the method for detecting the rotation operation is different from the first game example, as will be described later.

Here, as stated in "[Outline of first game example]" above, when the player performs the rotation operation described above, the controller moves so that the upper end of the controller moves along a larger circle than the lower end thereof (see FIG. 10). Therefore, the angular velocity (in other words, the orientation) about each of two axes (i.e., the x axis and the z axis shown in FIG. 4 or FIG. 5) that are perpendicular to the longitudinal direction of the controller changes periodically as the rotation operation is repeated, with one cycle of change corresponding to one rotation of the controller during the rotation operation. Thus, based on the angular velocities about the two axes, the rotation angle of the controller during one round of the rotation operation (in other words, the position of the controller on a circular trajectory) can be calculated. That is, based on the angular velocities with respect to the two axes, of the sensing results (i.e., the angular velocities) of the angular velocity sensor, it is possible to detect the rotation operation.

Thus, in the second game example, the information processing system 1 detects the rotation operation based on the sensing results of the angular velocity sensor (i.e., the angular velocities) for the two axes. Specifically, based on the angular velocities with respect to the two axes, the information processing system 1 calculates the orientation of the controller about the two axes. A two-dimensional value, whose components are two orientations calculated, represents the rotation angle of the controller during one round of the rotation operation. Therefore, the information processing system 1 can determine whether or not a rotation operation has been performed based on the two-dimensional value. Specifically, the information processing system 1 determines that a single iteration of the rotation operation has been performed when after the controller is at a certain rotation angle, the rotation angle returns to that rotation angle through a 360-degree change. Thus, it is possible to detect the rotation operation based on the sensing result of a two-axis angular velocity sensor, enabling the detection of the rotation operation by a simple method.

As described above, in the second game example, the information processing system 1 detects a rotation operation by determining the rotation angle of the controller during the rotation operation based on the angular velocity of the controller based on the output of the inertia sensor, which is the angular velocity of the controller with respect to two predetermined axes (i.e., the x axis and the z axis).

In the second game example, the information processing system 1 causes the controller to produce a predetermined vibration in accordance with the rotation operation of the controller. FIG. 15 is a diagram showing an example of a relationship between the rotation operation and the vibration of the controller in the second game example. In the second game example, the vibration of the controller in accordance with the rotation operation is not produced constantly, but is produced at points in time (t1 to t3 in FIG. 15) in accordance with rotation operations, as shown in FIG. 15. Specifically, the controller produces a vibration of a predetermined waveform once each time a single iteration of the rotation operation is performed (i.e., each time a single iteration of the rotation operation is detected). Then, the player can recognize, via vibration, that a rotation operation has been detected.

While the predetermined waveform may be any waveform, the predetermined waveform in the exemplary embodiment is a waveform such that the amplitude is small in the beginning, becomes larger in the middle and becomes small again in the end. Then, it is possible to reproduce, by way of vibrations, a force that is felt on the stick when actually spinning a plate, and it is possible to make the player feel as if the controller were the stick for plate spinning. That is, by way of vibrations as described above, it is possible to make the player feel as if the player were actually spinning a plate.

Note that the information processing system 1 may change the intensity of vibration of a controller in accordance with the speed of the rotation operation of the controller. That is, the information processing system 1 may vibrate the controller with a greater amplitude of the predetermined waveform as the detected speed of the rotation operation is higher. Then, it is possible to make the player feel more realistically as if the player were actually spinning a plate. Note that for example, the speed of the rotation operation may be calculated based on the amount of time required for a single iteration of the rotation operation, as in the first game example, or may be calculated as the maximum value of the speed of movement during one round of the rotation operation.

The information processing system 1 may change the intensity of vibration of a controller in accordance with the magnitude of the rotation operation of the controller (i.e., the size of the circular trajectory of the controller during the rotation operation). That is, the information processing system 1 may vibrate the controller with a greater amplitude of the predetermined waveform as the detected magnitude of the rotation operation is larger. Note that the magnitude of the rotation operation can be calculated, for example, based on the cumulative value of the magnitude of the two-dimensional vector, whose components are the angular velocities about the two axes described above, over the period of the rotation operation.

Note that in the second game example, there is no particular limitation on the method for detecting the rotation operation and the method for calculating the speed (or magnitude) of the rotation operation. In other embodiments, the rotation operation may be detected by using a method similar to the first game example or by using the sensing result of a 3-axis angular velocity sensor, for example. The information processing system 1 may detect the rotation operation by using the sensing result of an acceleration sensor instead of (or in addition to) an angular velocity sensor. The speed (in other words, velocity) of rotation may be calculated by any method based on the sensing result of the inertia sensor (i.e., the angular velocity and/or the acceleration of the controller).

In the second game example, the information processing system 1 controls the action of a plate (in other words, a plate object) in a virtual game space based on the rotation operation described above. There is no particular limitation on the method for controlling the action of the plate. In the second game example, the action (specifically, the rotation velocity) of the plate is controlled based on the following action rules.

Increase the rotation velocity of the plate in accordance with the speed (and/or magnitude) of the rotation operation.

Decrease the rotation velocity of the plate in accordance with the amount of time elapsed without a rotation operation.

The plate falls off the stick when the rotation velocity drops below a predetermined level.

The plate flies (in other words, falls) off the stick when the rotation velocity is kept at a predetermined level or more for a predetermined period of time.

The plate falls off when the controller is tilted from the upright position by a predetermined angle or more while the rotation operation is not being performed.

The plate falls off when the trajectory of the rotation operation significantly deviates from a circular trajectory.

Note that the angle by which the controller is tilted from the upright position can be calculated based on the output of the acceleration sensor and/or the angular velocity sensor, for example. According to the action rules above, the player controls the plate so that the plate does not fall off the stick by increasing the rotation velocity of the plate by performing the rotation operation or decreasing the rotation velocity of the plate by stop performing the rotation operation.

The information processing system 1 displays, on the display 12, a game image representing the action of the plate based on rotation operations. That is, a game image in accordance with the rotation velocity of the plate determined based on the action rules above is displayed on the display 12. For example, when the rotation velocity of the plate is too high, the information processing system 1 displays, on the display 12, a game image representing the plate rotating with significant side-to-side runout. For example, when the rotation velocity of the plate is too low, the information processing system 1 displays, on the display 12, a game image representing the plate rotating while wobbling up and down.

Note that in the second game example, the information processing system 1 may output a sound in accordance with the vibration of the controller from the speakers 88. For example, when the rotation operation is performed, a plate-spinning sound effect may be produced. Then, a sound effect may be produced such that the sound volume or the sound pitch varies in accordance with the speed of the rotation operation.

In the second game example, the information processing system 1 vibrates the controller while the plate is spinning on the stick, separately from the vibration in accordance with the rotation operation. As opposed to the vibration in accordance with the rotation operation, the vibration in accordance with the rotation of the plate is produced continuously while the plate is spinning on the stick. With the vibration in accordance with the rotation of the plate, it is possible to reproduce the vibration in accordance with the rotation of the plate, which is transmitted down to the stick, thereby making the player feel as if the controller were the stick for plate spinning.

In the exemplary embodiment, the vibration in accordance with the rotation of the plate is produced with an intensity that is determined in accordance with the rotation velocity of the plate. That is, as the rotation velocity of the plate is higher, the information processing system 1 uses a greater amplitude of vibration in accordance with the rotation of the plate. Then, the player can recognize a game status (i.e., the rotation velocity of the plate) based on the vibration of the controller, without looking at the game image displayed on the display 12. Note that in the second game example, since the rotation velocity of the plate increases in accordance with the speed of the rotation operation, the intensity of vibration of the spinning plate is higher as the speed of the rotation operation is higher.

In the second game example, when the vibration in accordance with the rotation operation and the vibration in accordance with the rotation of the plate are produced simultaneously, the information processing system 1 vibrates the controller with an intensity that is obtained by adding together these two intensities of vibration. Note that in the second game example, the two different vibrations are of the same frequency. In other embodiments, however, the two different vibrations may be of different frequencies from each other. In other embodiments, the two different vibrations may be of different waveforms and/or different vibration patterns.

As described above, according to the second game example, since the controller is vibrated in accordance with the rotation operation using the controller, it is possible to allow the player to intuitively recognize whether a rotation operation has been performed properly (in other words, whether the operation has been detected). Based on the intensity of vibration of the controller, it is possible to allow the player to intuitively recognize a game status (e.g., the speed of the rotation operation or the rotation velocity of the plate). Through the vibration of the controller, it is possible to make the player feel as if the player were actually spinning a plate.

Specific Game Process Example of Second Game Example

Figure 16:
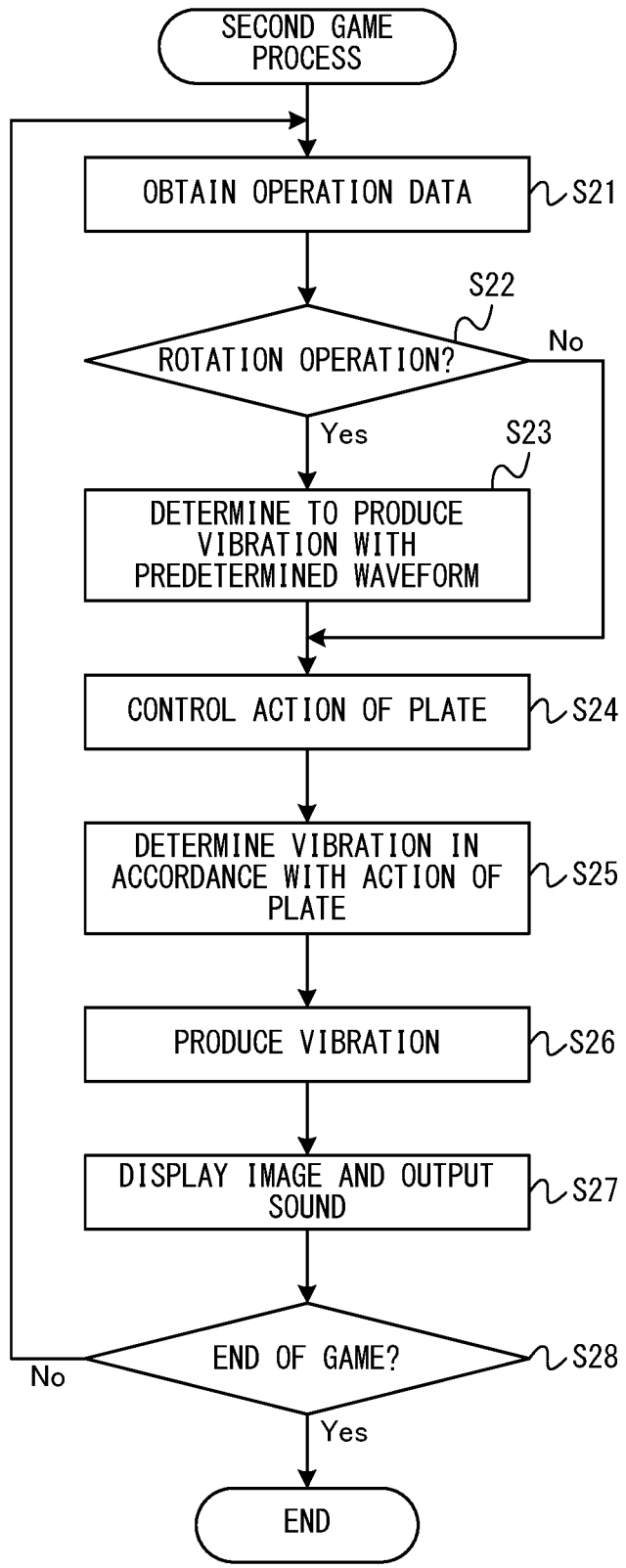
FIG. 16 is a flow chart showing an example flow of a second game process executed on an information processing system.

FIG. 16 is a flow chart showing an example flow of a game process of the second game example (referred to as the "second game process") to be executed on the information processing system. Note that in the exemplary embodiment, the game program stored in a storage section that can be accessed by the information processing system 1 includes a program of the second game process. The series of processes shown in FIG. 16 is started as the CPU 81 of the main body apparatus 2 executes the program of the second game process.

In step S21, the CPU 81 obtains operation data from the controller. The process of step S21 is similar to the process of step S1 of the first game process described above. The process of step S22 is executed, following step S21.

In step S22, the CPU 81 determines whether or not a rotation operation has been performed using the controller. That is, based on operation data stored in the DRAM 85, the CPU 81 determines whether or not a rotation operation has been performed using the controller associated with the operation data. Note that the detection of the rotation operation is done by the method described in "[Outline of second game example]" above. When the determination result of step S22 is affirmative, the process of step S23 is executed. On the other hand, when the determination result of step S22 is negative, the process of step S24 to be described later is executed, skipping the process of step S23.

In step S23, the CPU 81 determines that the controller is to produce the vibration in accordance with the rotation operation. Specifically, for the vibration of the predetermined waveform described above (i.e., the vibration in accordance with the rotation operation), the CPU 81 determines a vibration intensity (i.e., an amplitude) in accordance with the speed of the rotation operation detected in step S22. Note that information regarding the vibration determined in step S23 is stored in the DRAM 85. The process of step S24 is executed, following step S23.

In step S24, the CPU 81 controls the action of the plate in the virtual game space. That is, based on whether or not a rotation operation has been detected in step S22, etc., the CPU 81 determines the action of the plate (e.g., the rotation velocity thereof, whether the plate is to fall off, etc.) according to the action rules described above. Information regarding the action of the plate determined in step S24 is stored in the DRAM 85. The process of step S25 is executed, following step S24.

In step S25, the CPU 81 determines the manner of vibration (specifically, the intensity of vibration) for the vibration in accordance with the action of the plate determined in step S24 (i.e., the vibration in accordance with the rotation of the plate). That is, based on the information regarding the action of the plate stored in the DRAM 85, the CPU 81 determines whether or not to produce the vibration in accordance with the rotation of the plate, and determines the intensity of vibration if the vibration is to be produced. Note that information regarding the vibration determined in step S25 is stored in the DRAM 85. The process of step S26 is executed, following step S25.

In step S26, the CPU 81 vibrates the controller. That is, by referring to the information regarding the vibration stored in the DRAM 85, the CPU 81 transmits, to the controller, the vibration command described above for vibrating the vibrator of the controller. In the second game example, the content of the vibration command is determined so that the controller produces a vibration that is obtained by adding together the vibration determined in step S23 described above (i.e., the vibration in accordance with the rotation operation) and the vibration determined in step S25 described above (i.e., the vibration in accordance with the rotation of the plate). Note that in step S26, although the content specified by the vibration command described above differs from that of step S4 described above, the process operation for vibrating the controller is similar to the process of step S4 described above.

Note that the vibration in accordance with the rotation operation is produced in the process of step S26 over a plurality of iterations of the process loop from steps S21 to S28. Therefore, in the process of step S26 during the period in which the vibration in accordance with the rotation operation is produced, the CPU 81 determines the content of each vibration command to be transmitted during the period so that the controller produces a vibration that is obtained by adding together the two different vibrations. The process of step S27 is executed, following step S26.

In step S27, the CPU 81 displays a game image on the display 12, and outputs a game sound such as a BGM or a sound effect from the speakers 88. In the exemplary embodiment, the process of step S27 described above is executed at a rate of once per a predetermined period of time (i.e., one frame period), thereby outputting a moving image of the game image and a game sound. In the second game example, for example, the CPU 81 generates a game image representing the action of the plate determined in step S24 described above and displays the game image on the display 12. For example, a game sound in accordance with the vibration of the controller is output from the speakers 88. The process of step S28 is executed, following step S27.

In step S28, the CPU 81 determines whether or not to end the game. For example, when the plate has fallen off (game over) or when the plate is spun successfully for a predetermined period of time (game cleared), the CPU 81 determines to end the game. When the determination result of step S28 is negative, the process of step S21 is executed again. On the other hand, when the determination result of step S28 is affirmative, the CPU 81 ends the second game process shown in FIG. 16.

3-3: Third Game Example

The third game example will be described with reference to FIG. 17 to FIG. 19. The third game example is a game that can be played by a single player, and is a game in which the player turns the controller as if it were the dial of a safe with the goal of opening the safe. Note that since the player uses one controller in the third game example, a plurality of players can play the game simultaneously by using a plurality of controllers.

Outline of Third Game Example

Figure 17:
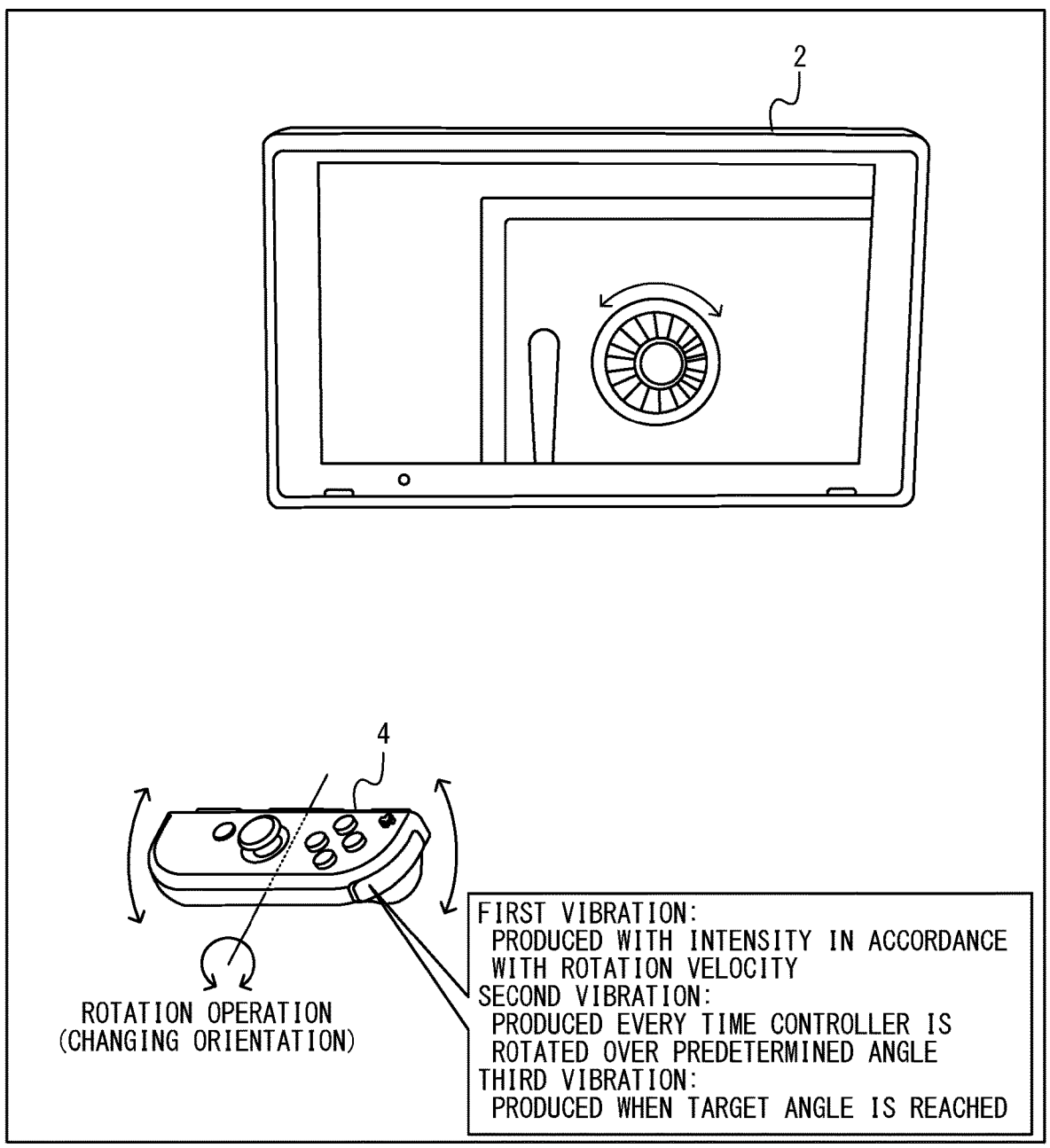
FIG. 17 is a diagram showing an example of an operation in a third game example.

FIG. 17 is a diagram showing an example of an operation of the third game example. In the third game example, as shown in FIG. 17, the player performs a rotation operation using the controller. The rotation operation of the third game example is an operation of turning the controller as if it were the dial of a safe. That is, in the third game example, the player rotates the controller held in a horizontal position about a predetermined axis (see FIG. 17; specifically, the x axis shown in FIG. 4 or FIG. 5) that is perpendicular to the longitudinal direction of the controller. As shown in FIG. 17, in the third game example, the rotation operation is an operation of changing the orientation of the controller.

In the third game example, the information processing system 1 calculates the orientation of the controller about the predetermined axis that is perpendicular to the longitudinal direction of the controller. Note that there is no particular limitation on the method for calculating the orientation, and the orientation can be calculated based on the sensing result of the inertia sensor. For example, the information processing system 1 can calculate the orientation based on accelerations for two axes that are perpendicular to the predetermined axis, or can calculate the orientation based on the angular velocity about the predetermined axis. In the third game example, a change in the orientation of the controller described above means a rotation operation being performed.

As described above, in the third game example, the orientation of the controller about at least a predetermined axis is calculated based on the output of the inertia sensor to detect the rotation operation based on the calculated orientation.

Figure 18:
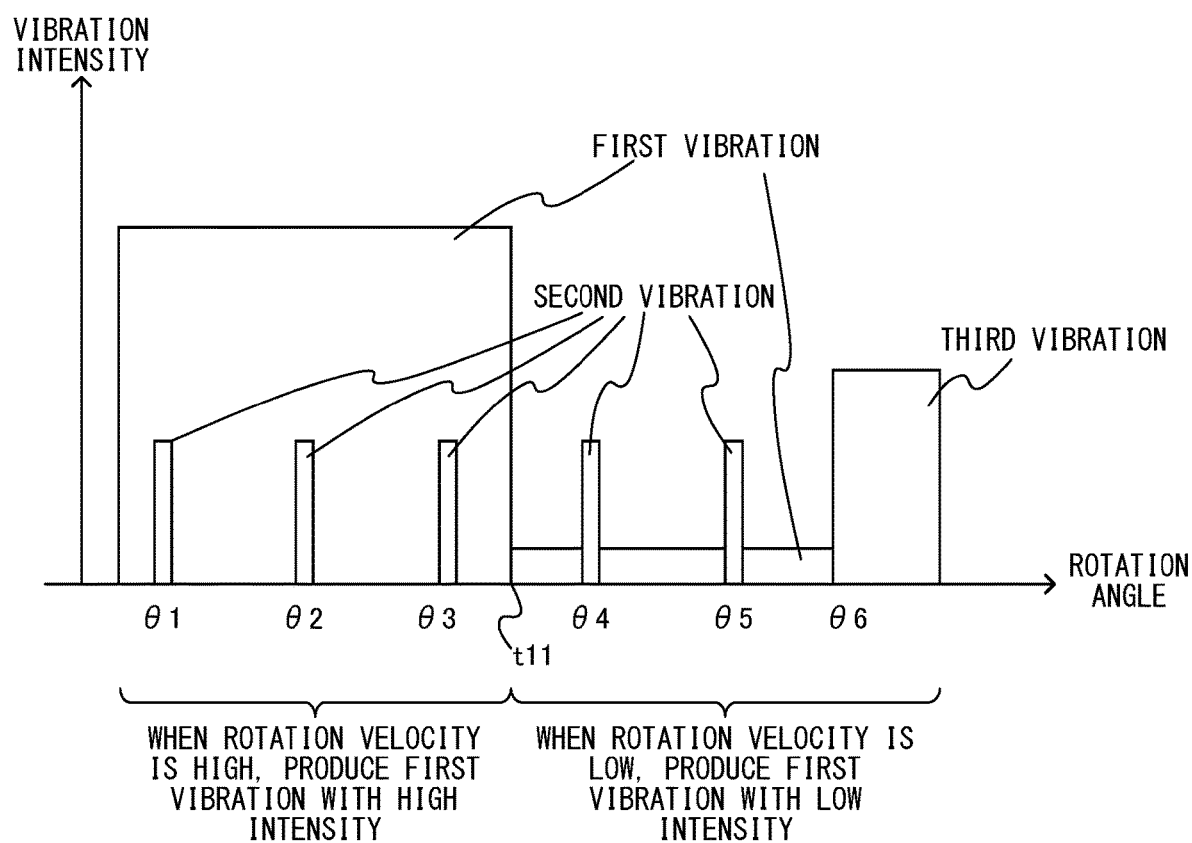
FIG. 18 is a diagram showing an example of a relationship between the rotation operation and the vibration intensity in the third game example.

FIG. 18 is a diagram showing an example of a relationship between the rotation operation and the vibration intensity in the third game example. In the graph shown in FIG. 18, the horizontal axis represents the rotation angle of the controller (i.e., the rotation angle (in other words, orientation) about the predetermined axis) that is changed through the rotation operation, and the vertical axis represents the vibration intensity of the controller. FIG. 18 shows periods of vibrations with the rotation angle of the controller being changed over time.

As shown in FIG. 18, in the third game example, the information processing system 1 causes the controller to produce three (first to third) vibrations. Each vibration has a different frequency. Specifically, the first vibration has the lowest frequency and the third vibration has the highest frequency.

The first vibration is a vibration in accordance with the rotation velocity of the controller (i.e., the speed of the rotation operation of the controller; in other words, the speed at which the orientation changes about the predetermined axis). That is, the information processing system 1 causes the controller to produce the first vibration with an intensity that is determined in accordance with the rotation velocity of the controller. As shown in FIG. 18, the first vibration has a higher intensity when the rotation velocity of the controller is higher and has a lower intensity when the rotation velocity of the controller is lower. Note that in the third game example, when the rotation velocity is greater than a predetermined value (the period prior to t11 in the example shown in FIG. 18), the information processing system 1 causes the controller to produce the first vibration with an intensity higher than the second vibration and the third vibration.

As described above, in the third game example, the first vibration is a vibration of a lower frequency. With such a first vibration, the information processing system 1 can make the player feel a resistance similar to that which is felt when turning the dial of a safe. In the third game example, as the player turns the controller faster, the intensity of the first vibration increases and thus the player feels a greater resistance. Thus, it is possible to make the player feel as if the player were actually turning the dial.

The second vibration is a vibration that is produced every time the orientation (in other words, the rotation angle) of the controller changes by a predetermined angle (e.g., 5°). That is, reference angles ($\theta 1$ to $\theta 6$ shown in FIG. 18) are predetermined with a separation of a predetermined angle therebetween, and the information processing system 1 causes the controller to produce the second vibration when the orientation of the controller becomes equal to one of the reference angles. Note that while the first vibration is produced constantly while the controller is being rotated, the second vibration is produced only for a predetermined period of time after the orientation of the controller becomes equal to one of the reference angles (see FIG. 18). Since the second vibration is produced each time the orientation of the controller changes over a predetermined angle, the player can recognize the speed at which the controller is being rotated based on how frequently the second vibration is produced. In the third game example, the intensity of the second vibration is constant.

As described above, in the third game example, the second vibration has a relatively high frequency. With such a second vibration, the information processing system 1 can give the player a feel that is similar to a click feel (i.e., a clicking sensation) that occurs when the dial of a safe is turned. That is, also with the second vibration, it is possible to make the player feel as if the player were actually turning the dial.

As described above, in the third game example, the information processing system 1 calculates, based on the output of the inertia sensor, the orientation of the controller at least about a predetermined axis (i.e., an axis perpendicular to the longitudinal direction). Then, the information processing system 1 causes the controller to produce the first vibration with an intensity that is determined in accordance with the speed of the rotation operation, and the second vibration that is produced every time the orientation of the controller changes by a predetermined amount.

The third vibration is a vibration that is produced in response to the orientation of the controller becoming equal to a predetermined target angle ($\theta 6$ shown in FIG. 18). Herein, the target angle is an angle that the player aims for during the rotation operation, and a lock of the dial is unlocked when the orientation of the controller is aligned at the target angle and a predetermined condition is satisfied (e.g., the controller remains still over a predetermined period of time).

The target angle is predetermined, and the information processing system 1 causes the controller to produce the third vibration in response to the orientation of the controller becoming equal to the target angle. Note that while the first vibration is produced constantly while the controller is being rotated, the third vibration is produced only for a predetermined period of time after the orientation of the controller becomes equal to the target angle (see FIG. 18). In the third game example, the intensity of the third vibration is constant.

The third vibration is such that the player can distinguish between the second vibration and the third vibration. That is, the third vibration may be different from the second vibration in terms of the manner of vibration and/or the period of vibration. For example, while the third vibration has a higher intensity than the second vibration in FIG. 18, the intensity may be the same as or lower than the second vibration in other embodiments. Moreover, the third vibration may have the same frequency as the second vibration, but differ from the second vibration in terms of at least one of the period of vibration, the intensity of vibration and the vibration pattern.

Herein, in the third game example, when the period of the second vibration and the period of the third vibration overlap each other, the information processing system 1 causes the controller to produce only the third vibration. When the period of the first vibration and the period of the second vibration or the third vibration overlap each other, the information processing system 1 causes the controller to produce the two different vibrations simultaneously. That is, as shown in FIG. 18, in the third game example, vibrations of two different frequencies (i.e., the first vibration and the second or third vibration) may be produced simultaneously. In such a case, the information processing system 1 may calculate a combined waveform between the two waveforms of vibration to vibrate the controller with the calculated waveform.

Note that as described above, in the exemplary embodiment, the main body apparatus 2 transmits, to the left controller 3, a vibration command that specifies the amplitude and frequency of vibration after every passage of the unit time (e.g., 5 [ms]) described above. Therefore, when vibrations of two different frequencies are produced simultaneously, the information processing system 1 may determine the amplitude and the frequency to be specified in the vibration command as follows.

For example, consider a case of combining together a first vibration having a frequency Wf1 and an amplitude Wa1 and a second vibration having a frequency Wf2 and an amplitude Wa2 in a unit period corresponding to a certain unit time of the vibration command. In such a case, the amplitude specified by the vibration command during the unit period may be calculated as the sum between the amplitude Wa1 and the amplitude Wa2. The frequency specified by the vibration command in the unit period is calculated as an average value obtained by adding a predetermined weight (e.g., a weight in accordance with the amplitude) to the frequency Wf1 and the frequency Wf2. Note that the predetermined weight may be any weight, and the frequency specified by the vibration command may be a simple average value between the frequency Wf1 and the frequency Wf2, for example.

Note that in other embodiments, when vibrations of two different frequencies are produced simultaneously, the main body apparatus 2 may cause the controller to produce only one of the vibrations (e.g., one with the larger amplitude).

In the third game example, the player performs the rotation operation described above using the controller so as to align the controller with the target angle. Herein, since the controller produces the third vibration when the controller is aligned with the target angle, the player can know the target angle based on the third vibration. In the third game example, a lock of the dial is unlocked by holding the controller still over a predetermined period of time while the controller is aligned with the target angle. When a lock of the dial is unlocked, a new target angle is set. In the third game example, the safe opens (game cleared) when a lock of the dial is unlocked a predetermined number of times (e.g., three times).

In the third game example, the information processing system 1 displays, on the display 12, a game image showing the dial of the safe being turned in accordance with the orientation of the controller. The information processing system 1 may display, on the display 12, an image showing a lock of the dial being unlocked.

Note that in the third game example, the information processing system 1 may output a sound in accordance with the vibration of the controller from the speakers 88. For example, a sound effect of the dial of the safe being turned (e.g., a clicking sound) may be output in sync with second vibrations. When the first vibration is produced, a sound effect may be produced whose sound volume or sound pitch change in accordance with the speed of the rotation operation. Note that no sound is output in sync with the third vibration in the third game example. Note however that a sound may be output in sync with the third vibration in other embodiments.

As described above, in the third game example, the intensity of the vibration of the controller (specifically, the first vibration) increases in accordance with the speed of the operation of rotating the controller. Then, the player can intuitively recognize the speed of the rotation operation, and can feel as if the player were actually turning the dial.

Specific Game Process Example of Third Game Example

Figure 19:
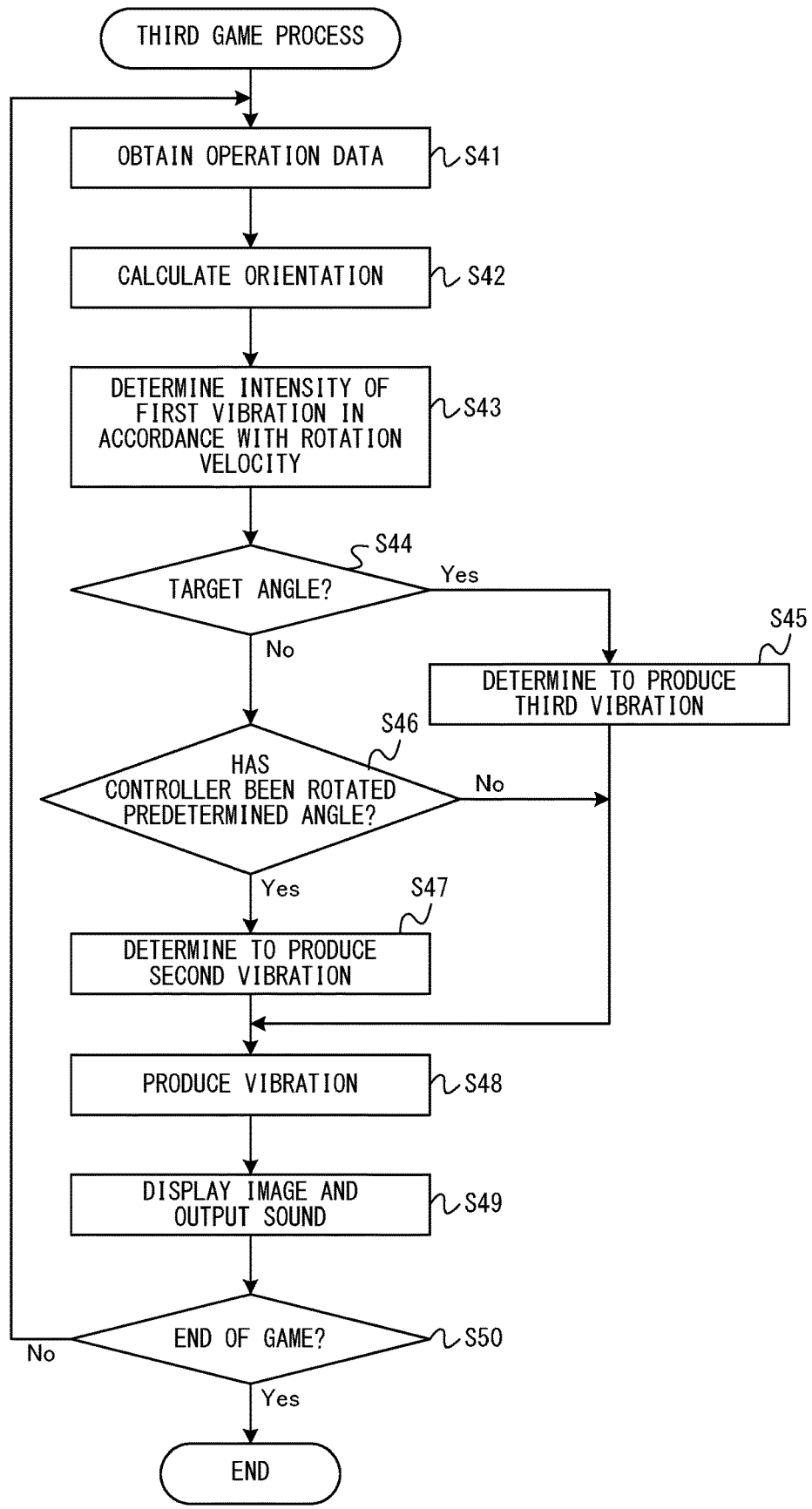
FIG. 19 is a flow chart showing an example flow of a third game process executed on an information processing system.

FIG. 19 is a flow chart showing an example flow of a game process of the third game example (referred to as the "third game process") to be executed on the information processing system. Note that in the exemplary embodiment, the game program stored in a storage section that can be accessed by the information processing system 1 includes a program of the third game process. The series of processes shown in FIG. 19 is started as the CPU 81 of the main body apparatus 2 executes the program of the third game process.

In step S41, the CPU 81 obtains operation data. The process of step S41 is similar to the process of step S1 of the first game process. The process of step S42 is executed, following step S41.

In step S42, the CPU 81 calculates the orientation of the controller. That is, the CPU 81 calculates the orientation of the controller based on the operation data stored in the DRAM 85 by the method described in "[Outline of third game example]" above. The information representing the calculated orientation is stored in the DRAM 85. The process of step S43 is executed, following step S42.

In step S43, the CPU 81 determines the intensity of the first vibration in accordance with the rotation velocity of the controller. That is, the CPU 81 calculates the rotation velocity of the controller based on the information representing the orientation stored in the DRAM 85, and determines the intensity of the first vibration based on the calculated rotation velocity. The information representing the determined intensity of the first vibration is stored in the DRAM 85. Note that when the controller is not in rotation (i.e., when the rotation velocity is zero), the intensity of vibration is set to zero. The process of step S44 is executed, following step S43.

In step S44, the CPU 81 determines whether or not the orientation of the controller has become equal to the target angle. The determination is made based on the information representing the orientation stored in the DRAM 85. When the determination result of step S44 is affirmative, the process of step S45 is executed. On the other hand, when the determination result of step S44 is negative, the process of step S46 to be described later is executed.

In step S45, the CPU 81 determines to produce the third vibration. That is, the CPU 81 stores, in the DRAM 85, information indicating that the third vibration is to be produced. The process of step S48 is executed, following step S45.

In step S46, the CPU 81 determines whether or not the controller has rotated for a predetermined angle. That is, the CPU 81 determines whether or not the orientation of the controller has become equal to one of the reference angles, based on the information representing the orientation stored in the DRAM 85. When the determination result of step S46 is affirmative, the process of step S47 is executed. On the other hand, when the determination result of step S46 is negative, the process of step S48 to be described later is executed, skipping the process of step S47.

In step S47, the CPU 81 determines to produce the second vibration. That is, the CPU 81 stores, in the DRAM 85, information indicating that the second vibration is to be produced. The process of step S48 is executed, following step S47.

In step S48, the CPU 81 vibrates the controller. That is, based on the information regarding the first to third vibrations stored in the DRAM 85, the CPU 81 generates a control command taking into consideration the first vibration and, if necessary, the second or third vibration. Note that the frequency and the amplitude specified by the control command are calculated by the method described in "[Outline of third game example]" above. Note that in step S48, although the content specified by the vibration command described above differs from that of step S4 described above, the process operation for vibrating the controller is similar to the process of step S4 described above. By the process of step S48, the controller produces a vibration that is determined taking into consideration the first vibration determined in step S43, the second vibration determined in step S47 and the third vibration determined in step S45.

Note that a single second vibration and a single third vibration are produced in the process of step S48 over a plurality of iterations of the process loop from steps S41 to S50. Therefore, in the process of step S48 during the period in which a single second vibration and/or a single third vibration are produced, the CPU 81 determines the content of each vibration command to be transmitted during the period so that the controller produces a vibration that is determined taking into consideration the first vibration and the second vibration and/or the single third vibration. The process of step S49 is executed, following step S48.

In step S49, the CPU 81 displays a game image on the display 12, and outputs a game sound such as a BGM or a sound effect from the speakers 88. In the exemplary embodiment, the process of step S49 described above is executed at a rate of once per a predetermined period of time (i.e., one frame period), thereby outputting a moving image of the game image and a game sound. In the third game example, for example, the CPU 81 generates a game image representing the dial of the safe being rotated in accordance with the orientation of the controller calculated in step S42 described above and displays the game image on the display 12. For example, a game sound in accordance with the vibration of the controller is output from the speakers 88. The process of step S50 is executed, following step S49.

In step S50, the CPU 81 determines whether or not to end the game. For example, when the safe is opened (game cleared) or when a predetermined time limit is reached since the start of the game (game over), the CPU 81 determines to end the game. When the determination result of step S50 is negative, the process of step SM is executed again. On the other hand, when the determination result of step S50 is affirmative, the CPU 81 ends the third game process shown in FIG. 19.

4. Summary of Embodiment Above and Variations Thereof

The information processing system of the above embodiment is a game system including a controller device (i.e., the controller) and an information processing device (i.e., the main body apparatus 2). The controller device includes the following elements:
- an inertia sensor (i.e., an acceleration sensor and/or an angular velocity sensor);
- an operation data transmission section configured to transmit operation data including data from the inertia sensor to the information processing device (i.e., the communication control section); and
- a vibrating portion (i.e., a vibrator) that vibrates based on a signal (i.e., a vibration command) obtained from the information processing device.

The information processing device includes the following elements:
- an operation data obtaining section configured to obtain operation data (steps S1, S7, S21 and S41);
- a determining section configured to determine the speed of the operation of rotating the controller device (i.e., the rotation operation) based on the operation data (step S3, S23 and S43);
- a vibration signal generation section configured to generate a vibration signal for vibrating the vibrating portion with an intensity that is determined in accordance with the speed of the rotating operation (step S4, S26 and S48); and
- a vibration signal transmission section configured to transmit the vibration signal to the controller device (i.e., a controller communication section).

Note that the information processing system of the above embodiment can be said to be determining the speed of the operation of moving the controller. In other embodiments, the information processing system may detect, as the controller moving operation, an operation of shaking the controller or an operation of thrusting the controller (see FIG. 12), instead of the rotation operation of the above embodiment, and calculate the speed of such an operation. Then, the information processing system 1 may change the intensity of vibration of the controller in accordance with the speed of the controller moving operation, as in the above embodiment. Note that the speed of the controller moving operation may refer to, for example, the speed of a single iteration of the controller moving operation (in other words, the inverse of the amount of time required for the single iteration of the controller moving operation), the velocity of moving the controller during a controller moving operation (in other words, the amount of movement per unit time), or the frequency of the controller moving operation.

Variations Regarding Manner of Vibration in Accordance With Speed of Rotation Operation In other embodiments, the information processing system 1 may change the frequency of the vibration of the controller in accordance with the speed of the rotation operation. For example, in the first step of the first game example, the information processing system 1 may control the vibration of the controller so that the frequency is higher as the amount of magic power that has been charged by the rotation operation is larger. Then, it is possible to produce a higher-frequency vibration (in other words, a vibration that gives an impression that the rotational speed is higher) as the amount of magic power is larger. Note that in the first step of the first game example, the information processing system 1 may control the vibration of the controller so that the frequency is lower as the amount of magic power that has been charged by the rotation operation is larger. Then, it is possible to produce a vibration that is felt heavier as the amount of magic power is larger.

In the second game example, the information processing system 1 may control the vibration of the controller so that the frequency is higher as the speed of the rotation operation is higher. Then, it is possible to make the player feel more realistically as if the player were actually spinning a plate, as in the above embodiment. In the third game example, the information processing system 1 may control the vibration of the controller so that the frequency is higher as the rotation velocity of the controller is higher. Then, it is possible to make the player feel as if the player were turning the dial of a safe, as in the above embodiment.

In other embodiments, the waveform of vibration of the controller may be changed in accordance with the speed of the rotation operation. Again, it is possible to change the manner of vibration in accordance with the speed of the rotation operation, as in a case in which the intensity or frequency of vibration is changed in accordance with the speed of the rotation operation. Therefore, it is possible to allow the player to recognize the speed of the rotation operation based on the manner of vibration, as in the case described above. For example, in the first step of the first game example, the information processing system 1 may control the vibration of the controller so that the vibration waveform includes more frequency components as the amount of magic power that has been charged by the rotation operation is larger.

Note that in other embodiments, the information processing system 1 may change some or all of the intensity, frequency and waveform of vibration of the controller in accordance with the speed of the rotation operation.

The above embodiment is applicable to a game system or a game program, for example, with which game statuses in accordance with operations can be more specifically expressed by way of vibrations.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

The invention claimed is:

1. A game system comprising a controller device and an information processing device, wherein:
the controller device comprises:
an inertia sensor;
a communication interface configured to transmit, to the information processing device, operation data including data from the inertia sensor; and
a vibrator configured to vibrate based on a vibration signal obtained from the information processing device;
the information processing device comprises a computer system including at least one computer processor; and
the computer system is configured to:
obtain the operation data;
determine, based on the operation data, whether an operation of rotating the controller device corresponds to a complete revolution of the controller device;
determine a speed of the rotating operation based on the operation data;
generate a vibration signal to vibrate the vibrator in accordance with (a) a predetermined vibration in response to a determination that the controller device has been rotated by a complete revolution, or (b) an intensity that increases with each successive rotating operation; and
transmit the vibration signal to the controller device.

2. The game system according to claim 1, wherein the computer system is configured to generate the vibration signal in such a manner that the vibrator is vibrated with a higher intensity when the speed of the rotating operation is relatively high as compared with a case in which the speed of the rotating operation is relatively low.

3. The game system according to claim 1, wherein the computer system is configured to generate the vibration signal in such a manner that a frequency of vibration of the vibrator changes in accordance with the speed of the rotating operation.

4. The game system according to claim 1, wherein:
the computer system is configured to generate a signal representing a waveform of vibration as the vibration signal;
the vibrator is caused to vibrate based on the waveform represented by the vibration signal; and
the computer system is configured to generate the vibration signal so that the waveform represented by the vibration signal changes in accordance with the speed of the rotating operation.

5. The game system according to claim 1, wherein:
the computer system is configured to calculate, based on an output of the inertia sensor, an orientation of the controller device about at least a predetermined axis; and
the computer system is configured to generate the vibration signal in such a manner that the vibrator produces a first vibration of an intensity that is determined in accordance with the speed of the rotating operation, and produces a second vibration every time the orientation of the controller device changes by a predetermined amount.

6. The game system according to claim 1, wherein the computer system is configured to identify a periodic change in an output of the inertia sensor and to detect the rotating operation based on the identified periodic change.

7. The game system according to claim 1, wherein the computer system is configured to detect the rotating operation by determining a rotation angle of the controller device for the rotating operation based on angular velocities of the controller device with respect to two predetermined axes based on an output of the inertia sensor.

8. The game system according to claim 1, wherein the computer system is configured to calculate, based on an output of the inertia sensor, an orientation of the controller device about at least a predetermined axis and to detect the rotating operation based on the calculated orientation.

9. The game system according to claim 1, wherein the computer system is configured to generate the vibration signal to vibrate the vibrator with an intensity that increases at each successive complete revolution.

10. A non-transitory computer-readable storage medium storing a game program to be executed on a computer system of an information processing device that is configured to communicate with a controller device, wherein:
the controller device comprises:
an inertia sensor;
a communication interface configured to transmit, to the information processing device, operation data including data from the inertia sensor; and
a vibrator configured to vibrate based on a vibration signal obtained from the information processing device; and
the game program, when executed, instructing the computer system to at least:
obtain the operation data;
determine, based on the operation data, whether an operation of rotating the controller device corresponds to a complete revolution of the controller device;
determine a speed of the rotating operation based on the operation data; and
generate a vibration signal to vibrate the vibrator in accordance with (a) a predetermined vibration in response to a determination that the controller device has been rotated by a complete revolution, or (b) an intensity that increases with each successive rotating operation.

11. The storage medium according to claim 10, wherein the computer system is configured to generate the vibration signal in such a manner that the vibrator is vibrated with a higher intensity when the speed of the rotating operation is relatively high as compared with a case in which the speed of the rotating operation is relatively low.

12. The storage medium according to claim 10, wherein the computer system is configured to generate the vibration signal in such a manner that a frequency of vibration of the vibrator changes in accordance with the speed of the rotating operation.

13. The storage medium according to claim 10, wherein:
the computer system is configured to generate a signal representing a waveform of vibration as the vibration signal;
the vibrator is caused to vibrate based on the waveform represented by the vibration signal; and the computer system is configured to generate the vibration signal so that the waveform represented by the vibration signal changes in accordance with the speed of the rotating operation.

14. The storage medium according to claim 10, wherein:
the computer system is configured to calculate, based on an output of the inertia sensor, an orientation of the controller device about at least a predetermined axis; and
the computer system is configured to generate the vibration signal in such a manner that the vibrator produces a first vibration of an intensity that is determined in accordance with the speed of the rotating operation, and produces a second vibration every time the orientation of the controller device changes by a predetermined amount.

15. The storage medium according to claim 10, wherein the computer system is configured to identify a periodic change in an output of the inertia sensor and detect the rotating operation based on the identified periodic change.

16. The storage medium according to claim 10, wherein the computer system is configured to detect the rotating operation by determining a rotation angle of the controller device for the rotating operation based on angular velocities of the controller device with respect to two predetermined axes based on an output of the inertia sensor.

17. The storage medium according to claim 10, wherein the computer system is configured to calculate, based on an output of the inertia sensor, an orientation of the controller device about at least a predetermined axis and detect the rotating operation based on the calculated orientation.

18. The storage medium according to claim 10, wherein the computer system is configured to generate the vibration signal to vibrate the vibrator with an intensity that increases at each successive complete revolution.

19. An information processing device configured to communicate with a controller device, wherein:
the controller device comprises:
an inertia sensor;
a communication interface configured to transmit, to the information processing device, operation data including data from the inertia sensor; and
a vibrator configured to vibrate based on a vibration signal obtained from the information processing device;
the information processing device comprises a computer system including at least one computer processor; and
the computer system is configured to:
obtain the operation data;
determine, based on the operation data, whether an operation of rotating the controller device corresponds to a complete revolution of the controller device;
determine a speed of the rotating operation based on the operation data;
generate a vibration signal to vibrate the vibrator in accordance with (a) a predetermined vibration in response to a determination that the controller device has been rotated by a complete revolution, or (b) an intensity that increases with each successive rotating operation; and
transmit the vibration signal to the controller device.

20. The information processing device according to claim 19, wherein the computer system is configured to generate the vibration signal to vibrate the vibrator with an intensity that increases at each successive complete revolution.

21. An information processing method to be executed on a game system comprising a controller device and an information processing device, wherein:
the controller device comprises an inertia sensor and a vibrator; and
the information processing device executes:
obtaining operation data including data from the inertia sensor;
determining, based on the operation data, whether an operation of rotating the controller device corresponds to a complete revolution of the controller device;
determining a speed of the rotating operation based on the operation data; and
vibrating the vibrator in accordance with (a) a predetermined vibration in response to a determination that the controller device has been rotated by a complete revolution, or (b) an intensity that increases with each successive rotating operation.

22. The information processing method device according to claim 21, wherein (b) comprises vibrating the vibrator with an intensity that increases at each successive complete revolution.

* * * * *